United States Patent
Lim et al.

(10) Patent No.: US 9,661,324 B2
(45) Date of Patent: May 23, 2017

(54) METHOD FOR SIGNALING IMAGE INFORMATION, AND METHOD FOR DECODING IMAGE INFORMATION USING SAME

(71) Applicant: LG Electronics Inc., Seoul (KR)

(72) Inventors: Jae Hyun Lim, Seoul (KR); Seung Wook Park, Seoul (KR); Jung Sun Kim, Seoul (KR); Yong Joon Jeon, Seoul (KR); Joon Young Park, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/753,850

(22) Filed: Jan. 30, 2013

(65) Prior Publication Data

US 2013/0142259 A1 Jun. 6, 2013

Related U.S. Application Data

(63) Continuation of application No. PCT/KR2011/008949, filed on Nov. 23, 2011.
(Continued)

(51) Int. Cl.
*H04N 7/12* (2006.01)
*H04N 19/46* (2014.01)
(Continued)

(52) U.S. Cl.
CPC ....... *H04N 19/00545* (2013.01); *H04N 19/46* (2014.11); *H04N 19/91* (2014.11); *H04N 19/13* (2014.11)

(58) Field of Classification Search
None
See application file for complete search history.

(56) References Cited

U.S. PATENT DOCUMENTS

2002/0101924 A1 * 8/2002 Suzuki et al. ............. 375/240.2
2006/0062299 A1 * 3/2006 Park et al. ................ 375/240.12
(Continued)

FOREIGN PATENT DOCUMENTS

| CN | 100407224 | 7/2008 |
| CN | 103155555 | 6/2013 |

(Continued)

OTHER PUBLICATIONS

International Search Report dated May 1, 2012 for Application No. PCT/KR2011/008949, with English Translation, 5 pages.
(Continued)

*Primary Examiner* — Frederick Bailey
(74) *Attorney, Agent, or Firm* — Fish & Richardson P.C.

(57) ABSTRACT

The present invention relates to a method offor signaling information on a prediction mode and to a method of for decoding image information using same. According to the present invention, the method offor signaling prediction mode information, serving according to the present invention, as a method offor signaling image information, includes performing prediction on a current block and signaling the prediction-type information applied to the current block. The signaling of the information includes joint-coding and components of signaling information components constituting the prediction-type information. According to the present invention, overhead may be reduced when information on a prediction is signaled.

11 Claims, 26 Drawing Sheets

Related U.S. Application Data

(60) Provisional application No. 61/417,265, filed on Nov. 25, 2010, provisional application No. 61/418,876, filed on Dec. 2, 2010, provisional application No. 61/421,193, filed on Dec. 8, 2010, provisional application No. 61/432,601, filed on Jan. 14, 2011, provisional application No. 61/441,655, filed on Feb. 11, 2011.

(51) Int. Cl.
*H04N 19/91* (2014.01)
*H04N 19/13* (2014.01)

(56) References Cited

U.S. PATENT DOCUMENTS

| | | | | |
|---|---|---|---|---|
| 2008/0043843 | A1* | 2/2008 | Nakaishi | 375/240.16 |
| 2008/0056389 | A1* | 3/2008 | Chiang et al. | 375/240.29 |
| 2008/0107181 | A1* | 5/2008 | Han et al. | 375/240.16 |
| 2008/0152000 | A1* | 6/2008 | Kaushik | 375/240.03 |
| 2008/0260027 | A1 | 10/2008 | Karczewicz | |
| 2010/0135387 | A1* | 6/2010 | Divorra Escoda | H04N 19/159 |
| | | | | 375/240.12 |
| 2010/0309870 | A1 | 12/2010 | Wengerter et al. | |
| 2011/0274158 | A1* | 11/2011 | Fu et al. | 375/240.02 |
| 2012/0082210 | A1* | 4/2012 | Chien et al. | 375/240.02 |
| 2012/0128067 | A1* | 5/2012 | Liu et al. | 375/240.12 |
| 2012/0189055 | A1* | 7/2012 | Chien et al. | 375/240.14 |
| 2012/0189062 | A1* | 7/2012 | Sugio et al. | 375/240.16 |
| 2012/0195366 | A1* | 8/2012 | Liu et al. | 375/240.02 |

FOREIGN PATENT DOCUMENTS

| | | |
|---|---|---|
| EP | 2073419 A1 | 6/2009 |
| EP | 2073419 B1 | 10/2011 |
| EP | 2924996 | 9/2015 |
| JP | 2008-048289 | 2/2008 |
| JP | 2008-211697 | 9/2008 |
| JP | 2009-246972 | 10/2009 |
| JP | 2010-114933 | 5/2010 |
| JP | 2013-530658 | 7/2013 |
| KR | 2010-0005125 A | 1/2010 |
| KR | 2010-0005218 A | 1/2010 |
| KR | 2010-0072347 A | 6/2010 |
| KR | 2010-0096254 A | 9/2010 |
| WO | WO 2008/131042 A1 | 10/2008 |
| WO | WO 2009/080290 A1 | 7/2009 |
| WO | 2010/050706 | 5/2010 |
| WO | 2012/115520 | 8/2012 |

OTHER PUBLICATIONS

Korean Office Action dated Jan. 17, 2014 for Application No. 10-2013-7002967, 4 Pages.

European Search Report dated Apr. 28, 2014 for Application No. 11843220.2, 7 pages.

Marta Karczewicz, et al. "Improvements on VLC ", Joint Collaborative Team on Video Coding (JCT-VC) of ITU-T SG16 WP3 and ISO/IEC JTC1/SC29/WG11 3rd Meeting: Guangzhou, CN, Oct. 7-15, 2010 (XP030007970).

Arild Fuldseth, et al, "Recent improvements of the low complexity entropy coder in TMuC", Joint Collaborative Team on Video Coding (JCT-VC) of ITU-T SG16 WP3 and ISO/IEC JTC1/SC29/WG11 3rd Meeting: Guangzhou, CN, Oct. 7-15, 2010 (XP030046806).

Search Report dated Jun. 5, 2015 from corresponding European Patent Application No. 11843220.2, 5 pages.

Wiegand et al., "WD1: Working Draft 1 of High-Efficiency Video Coding", Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, Document No. JCTVC-C403, 137 pages.

Office Action issued in Japanese Application No. 2013-540890 on Dec. 8, 2015, 4 pages.

Fuldseth et al., "Recent improvements of the low complexity entropy coder in TMuC," 3$^{rd}$ Meeting, Joint Collaborative Team on Video Coding (JCT-VC) of ITU-T SG16 WP3 and ISO/IEC JTC1/SC29/WG11, JCTVC-C185r1, Oct. 7-15, 2010, 8 pages.

Karczewicz et al., "Improvements on VLC," 3$^{rd}$ Meeting, Joint Collaborative Team on Video Coding (JCT-VC) of ITU-T SG16 WP3 and ISO/IEC JTC1/SC29/WG11, JCTVC-C263, Oct. 7-15, 2010, 5 pages.

Office Action issued in Chinese Application No. 201180056699.8 on Dec. 30, 2015, 8 pages.

\* cited by examiner

FIG. 19
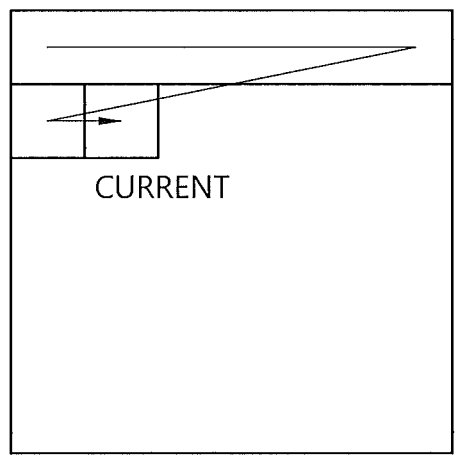
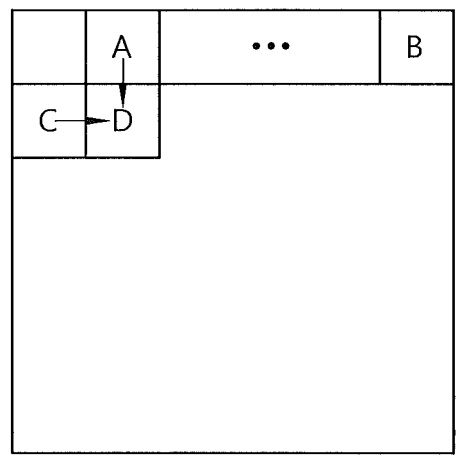
(a)　　　　　　　　　　　(b)

FIG. 24
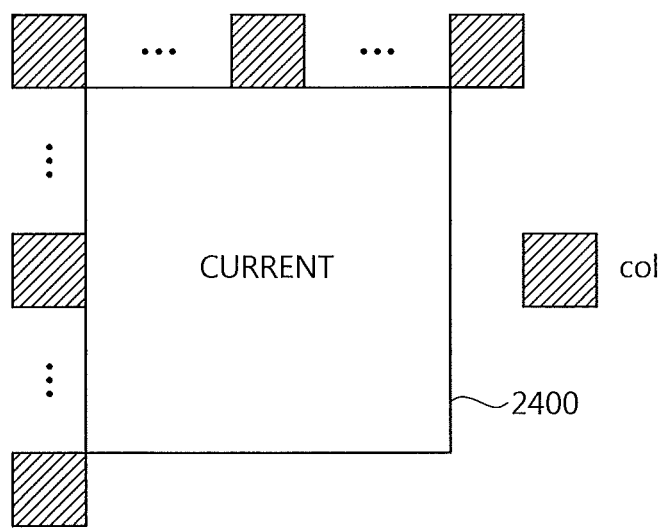
 CANDIDATE

METHOD FOR SIGNALING IMAGE INFORMATION, AND METHOD FOR DECODING IMAGE INFORMATION USING SAME

CROSS RELATED APPLICATIONS

This application is a continuation of International Application PCT/KR2011/008949, filed Nov. 23, 2011, which claims priority from U.S. Provisional Application Nos. 61/417,265, filed Nov. 25, 2010, 61/418,876, filed Dec. 2, 2010, 61/421,193, filed Dec. 8, 2010, 61/432,601, filed Jan. 14, 2011 and 61/441,655, filed Feb. 11, 2011. The disclosures of the prior applications are considered part of (and are incorporated by reference in) the disclosure of this application.

TECHNICAL FIELD

The present invention relates to image information compression technology, and more particularly, to a method of signaling information on a prediction mode and a method of decoding image information using the same.

BACKGROUND ART

The need for images having high resolution and high quality has recently been increasing in various fields. As the resolution and quality of an image is improved, however, the amount of data in the image is also likewise increased. Accordingly, if image data is transmitted using a medium such as an existing wired/wireless broadband line, or image data is stored using an existing storage medium, the costs of transmitting and storing data are also increased. In order to effectively transmit, store, and play information within an image having high resolution and high quality, image compression technology utilizing high efficiency can be used.

In order to improve image compression efficiency, inter-prediction and intra-prediction can be used. In the inter-prediction method, the pixel values within a current picture are predicted using as a reference the information found in other pictures. In the intra-prediction method, the pixel values of a current picture are predicted using the correlation between pixels within the same picture.

Meanwhile, as entropy coding method, there are a method using context-based adaptive binary arithmetic coding (CABAC) and a method using context-based adaptive variable length coding (CAVLC).

In the CABAC method, a probability model for each syntax element is selected depending on context, the probability values of the probability model being changed through internal statistics, and compression is performed using arithmetic coding. Alternatively, if CAVLC is used as an entropy coding model, coding is performed on each syntax element using a variable length coding (VLC) table.

DISCLOSURE

Technical Problem

The present invention provides a signaling method and apparatus capable of reducing transmission overhead.

The present invention also provides a method and apparatus for signaling information on a prediction type that is applied to a current block through joint coding.

The present invention also provides a method and apparatus for determining signaling order by taking the frequency of occurrence of each prediction type into consideration.

The present invention also provides a method and apparatus for allocating a codeword for a prediction type by taking the frequency of occurrence of each prediction type into consideration.

The present invention also provides a method and apparatus for adapting a codeword for a prediction type by taking the frequency of occurrence of each prediction type into consideration.

The present invention also provides a method and apparatus for effectively selecting a most probable mode (MPM) in order to increase compression efficiency and prediction effect.

Technical Solution (1) An embodiment of the present invention relates to a method of signaling video information, including performing prediction on a current block and signaling information on a prediction type applied to the current block, wherein signaling the information on the prediction type may include jointly coding information elements forming the information on the prediction type and signaling the jointly-coded information elements.

(2) In (1), the information elements may include information on prediction mode and information on partition size.

(3) In (2), the information elements may include at least one of information on whether a block has been partitioned or not and information on a slice type.

(4) In (1), a short codeword may be allocated to a prediction type having a high selection ratio by way of joint coding.

(5) In (1), whether a specific prediction type from among multiple prediction types which are applicable to the current block is applied or not may be separately signaled using a flag.

(6) In (5), the specific prediction type may be a skip mode.

(7) In (5), the specific prediction type may include a skip mode and a merge mode, wherein whether the skip mode is applied to the current block or not may be preferentially signaled, and whether the merge mode is applied to the current block or not may be signaled if an application of an inter-prediction mode to the current block is signaled.

(8) In (5), a short codeword may be allocated to a prediction type having a high selection ratio by way of joint coding.

(9) Another embodiment of the present invention relates to a method of decoding video information, including receiving information, performing prediction on a current block based on the received information, and reconstructing the current block based on the prediction, wherein the received information comprises information elements which are jointly coded and the information elements form a prediction type applied to the current block.

(10) In (9), the information elements may include information on prediction mode and information on partition size.

(11) In (10), the information elements may include at least one of information on whether a block has been partitioned or not and information on a slice type.

(12) In (9), a short codeword may be allocated to a prediction type having a high frequency of occurrence, from among multiple prediction types, by way of joint coding.

(13) In (9), whether a specific prediction type from among multiple prediction types which are applicable to the current block is applied or not may be received as separate information using a flag.

(14) In (13), the specific prediction type may include a skip mode and merge mode, information on whether the skip mode is applied to the current block or not may be preferentially received, and information on whether the merge mode is applied to the current block or not may be received if application of an inter-prediction mode to the current block is signaled.

Advantageous Effects

In accordance with the present invention, overhead can be reduced when information on prediction is signaled.

In accordance with the present invention, signaling overhead can be reduced by performing joint coding on information on a prediction type that is applied to a current block.

In accordance with the present invention, transmission efficiency can be improved by determining the signaling order or allocating a codeword taking the frequency of occurrence of each prediction type into consideration.

In accordance with the present invention, transmission overhead and the amount of bits transmitted can be reduced by adapting a codeword for a prediction type by taking the frequency of occurrence of each prediction type into consideration.

In accordance with the present invention, compression efficiency and prediction effects can be improved by effectively selecting a most probable mode (MPM).

DESCRIPTION OF DRAWINGS

FIG. 19 is a diagram schematically illustrating a codeword adaptation method.

FIG. 24 is a diagram schematically illustrating the extension of MPM candidates in a system to which the present invention is applied.

MODE FOR INVENTION

Figure 1:
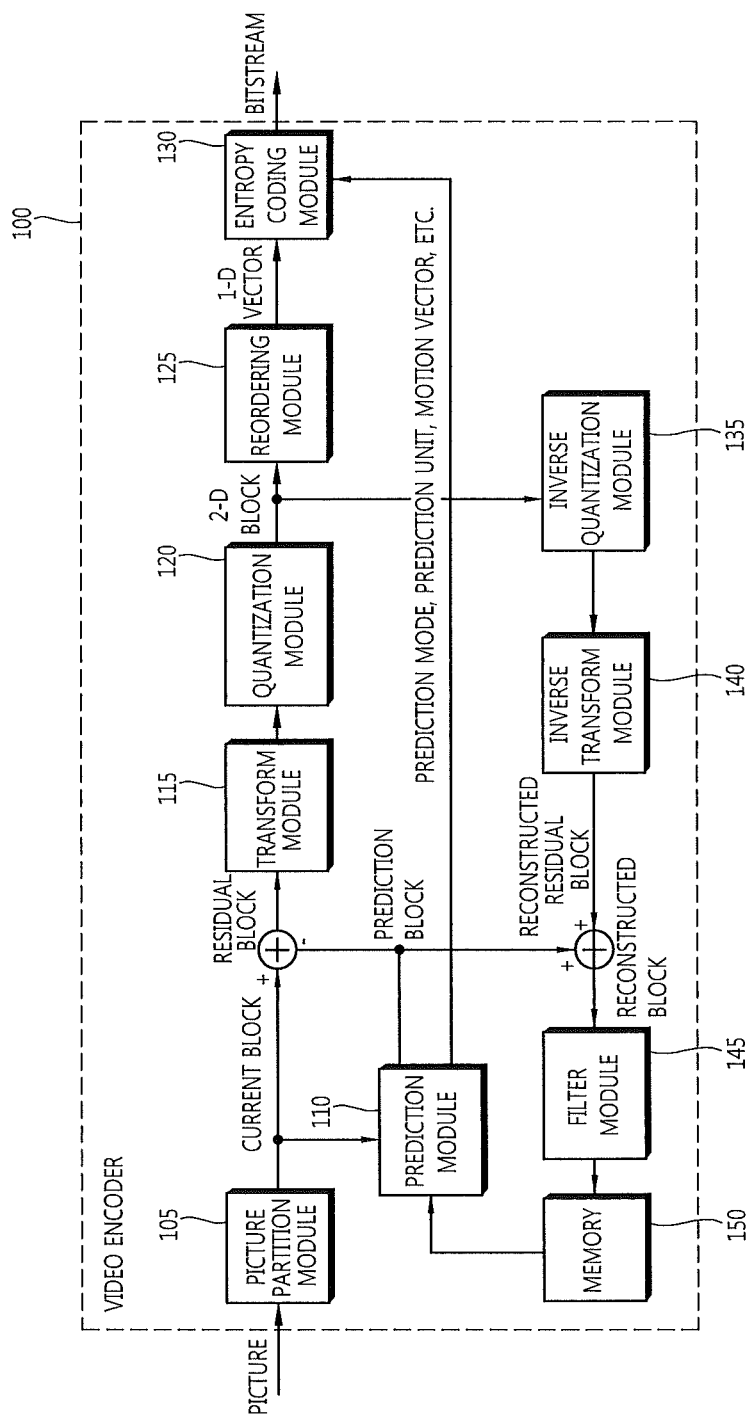
FIG. 1 is a block diagram schematically showing a video coding apparatus (or encoder) in accordance with an embodiment of the present invention.

The present invention may be modified in various ways, and the present invention may have several embodiments. Specific embodiments of the present invention are illustrated in the drawings and described in detail. However, the present invention is not limited only to the specific embodiments given. The terms used in this specification are used to describe only the specific embodiments and are not intended to restrict the technical scope of the present invention. An expression referencing a singular value additionally refers to a corresponding expression of the plural number, unless explicitly limited otherwise by the context. In this specification, terms such as "comprise" or 'have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

Meanwhile, elements in the drawings described in the present invention are independently illustrated for convenience of description regarding the different characteristics and functions of video coding and decoding apparatuses, but this does not indicate that each of the elements is implemented using separate hardware or separate software. For example, two or more of the elements may be combined to form one element, and one element may be divided into a plurality of elements. It is to be noted that embodiments in which some elements are integrated into one combined element and/or an element is separated into multiple separate elements are included in the scope of the present invention, given that they do not depart from the essence of the present invention.

Hereinafter, some exemplary embodiments of the present invention are described in detail with reference to the accompanying drawings. Hereinafter, the same reference numerals will designate the same elements throughout the drawings, and redundant description of the same elements is omitted.

FIG. 1 is a block diagram schematically showing a video encoding apparatus (or encoder) in accordance with an embodiment of the present invention. Referring to FIG. 1, the video coding apparatus 100 includes a picture partition module 105, a prediction module 110, a transform module 115, a quantization module 120, a reordering module 125, an entropy coding module 130, an inverse quantization module 135, an inverse transform module 140, a filter module 145, and memory 150.

The picture partition module 105 may partition an input picture into one or more processing units. The processing unit may be a prediction unit (hereinafter referred to as a 'PU'), a transform unit (hereinafter referred to as a 'TU'), or a coding unit (hereinafter referred to as a 'CU').

The prediction module 110 includes an inter prediction module for performing inter-prediction and an intra prediction module for performing intra-prediction, as will be described later. The prediction module 110 generates a prediction block by performing prediction on the processing unit of a picture output from the picture partition module 105. The processing unit of the picture in the prediction module 110 may be a CU, a TU, or a PU. Furthermore, the prediction module 110 may determine whether prediction performed on a corresponding processing unit is inter-prediction or intra-prediction and determine the detailed content (e.g., prediction mode) of each prediction method. Here, the processing unit on which prediction is performed, and the processing unit on which the prediction method and detailed contents are determined may be different types of units. For example, the prediction method and prediction mode may be determined in a PU unit, and prediction may be performed in a TU unit.

The prediction block may be generated by performing the prediction based on information on at least one of a picture anterior to the current picture and/or a picture posterior to the current picture through inter-prediction. Furthermore, the prediction block may be generated by performing the prediction based on information on pixels within the current picture by way of intra-prediction.

In inter-prediction, a reference picture for a PU may be selected, and a block having the same size as the PU may be selected as a reference block in an integer pixel sample unit. Next, as for the current PU, a prediction block that has a minimum residual signal and has a minimum motion vector size is generated. A skip mode, merge mode, or motion vector prediction (MVP) may be used for the inter prediction method. The prediction block may be generated in a sample unit smaller than an integer, such as a ½ pixel unit and a ¼ pixel unit. Here, the motion vector may be represented in a unit smaller than an integer pixel. For example, a luma pixel may be represented in a ¼ pixel unit, and a chroma pixel may be represented in a ⅛ pixel unit.

Pieces of information on the index of the reference picture, a motion vector (e.g., a motion vector predictor), and a residual signal selected through inter-prediction are entropy coded and signaled to a decoder.

If intra-prediction is performed, a prediction mode may be determined in a PU unit and prediction may be performed in a PU unit. Furthermore, a prediction mode may be determined in a PU unit and intra-prediction may be performed in a TU unit.

In intra-prediction, a prediction mode may be one of 33 directional prediction modes and two or more non-directional modes. The non-directional modes may include DC prediction modes and planar modes.

In intra-prediction, a prediction block may be generated according to the prediction mode after an adaptive intra smoothing (AIS) filter applied to a reference pixel. The types of AIS filter applied to the reference pixel may be different. Furthermore, in intra-prediction, prediction may be performed according to the prediction mode of the current block interpolating the reference pixel in a ⅛ pixel unit.

A PU can have a variety of sizes and forms. For example, in the case of inter-prediction, a PU may have a size such as 2N×2N, 2N×N, N×2N, or N×N. In the case of intra-prediction, a PU may have a size such as 2N×2N or N×N (N being an integer in the above two examples). Here, a PU having the N×N size may be set to be exclusively applied to a specified case. For example, a PU having any given N×N size may be used only for a minimum size coding unit or may be used only in the case of intra-prediction. In addition to the PUs having the above-described sizes, a PU having a size, such as N×mN, mN×N, 2N×mN, or mN×2N (m<1), may be further defined and used.

A residual value (or a residual block or a residual signal) between the generated prediction block and an original block is input to the transform module 115. Furthermore, information on prediction mode, information on the motion vector, etc. that are used for the prediction are coded, together with the residual value, in the entropy coding module 130 and signaled to the decoder.

The transform module 115 may performs transformation on the residual block in the transform unit and generates transform coefficients. The unit of transform in the transform module 115 may be a TU, and the transform unit may have a quad tree structure. Here, the size of the transform unit may be determined within a predetermined range having maximum and minimum values. The transform module 115 may transform the residual block using discrete cosine transform (DCT) and/or discrete sine transform (DST).

The quantization module 120 may generate quantization coefficients by quantizing the residual values transformed by the transform module 115. The quantization coefficients generated by the quantization module 120 are provided to the inverse quantization module 135 and the reordering module 125.

The reordering module 125 reorders the quantization coefficients provided by the quantization module 120. By reordering the quantization coefficients, coding efficiency in the entropy coding module 130 can be improved. The reordering module 125 may reorder the quantization coefficients of a two-dimensional block form to quantization coefficients of a one-dimensional vector form using a coefficient scanning.

The reordering module 125 may change the order of coefficient scanning based on the probability statistics of the quantization coefficients transmitted by the quantization module 120, so that entropy coding efficiency in the entropy coding module 130 can be improved.

The entropy coding module 130 may perform entropy coding on the quantization coefficients reordered by the reordering module 125. An entropy coding method, such as exponential Golomb, context-adaptive variable length coding (CAVLC), or context-adaptive binary arithmetic coding (CABAC), may be used in the entropy coding. The entropy coding module 130 may encode various pieces of information received from the reordering module 125 and the prediction module 110, such as information on the quantization coefficients and block type of a CU, information on prediction mode, information on a partition unit, information on a PU, information on a signaling unit, information on a motion vector, information on a reference picture, information on the interpolation of a block, and information on filtering.

Furthermore, the entropy coding module 130 may apply a specific change to a received parameter set or syntax as needed.

The inverse quantization module 135 performs inverse quantization on the values quantized by the quantization module 120, and the inverse transform module 140 performs inverse transform on the values inversely quantized by the inverse quantization module 135. The residual values generated from the inverse quantization module 135 and the inverse transform module 140 may be added to the prediction block predicted by the prediction module 110, thereby being capable of generating a reconstructed block.

The filter module 145 may apply a deblocking filter, an adaptive loop filter (ALF), or a sample adaptive offset (SAO) to a reconstructed picture.

The deblocking filter may remove block distortion occurring at the boundary of the blocks in the reconstructed picture. The ALF may perform filtering based on a comparison of the reconstructed image, after the block is filtered by the deblocking filter, with the original image. The ALF may be utilized only in instances of high efficiency. The SAO may restore an offset (difference) between the residual block to which the deblocking filter has been applied and the original picture in a pixel unit, and the SAO may be applied in the form of a band offset or an edge offset.

Meanwhile, the filter module 145 may not apply filtering on a reconstructed block used in inter-prediction.

The memory 150 may store the reconstructed block or picture output from the filter module 145. The reconstructed block or picture stored in the memory 150 may be provided to the prediction module 110 for performing inter-prediction.

Figure 2:
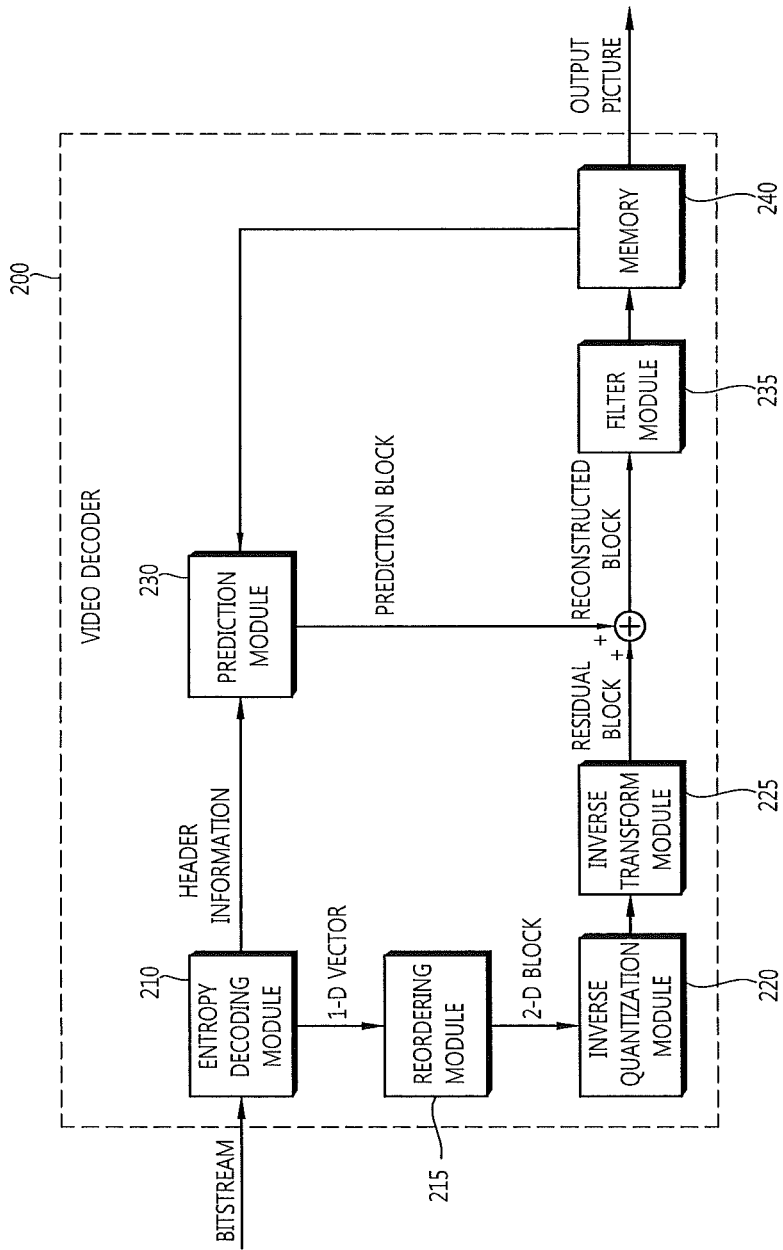
FIG. 2 is a block diagram schematically showing a video decoder in accordance with an embodiment of the present invention.

FIG. 2 is a block diagram schematically showing a video decoder in accordance with an embodiment of the present invention. Referring to FIG. 2, the video decoder 200 can include an entropy decoding module 210, a reordering module 215, an inverse quantization module 220, an inverse transform module 225, a prediction module 230, a filter module 235, and memory 240.

When an image bit stream is received from the encoder, the input bit stream may be decoded according to a procedure by which video information has been processed by the encoder.

For example, if variable length coding (hereinafter referred to as 'VLC'), such as CAVLC, has been used in order for the encoder to perform entropy coding, the entropy decoding module 210 may perform entropy decoding by implementing the same VLC table as that used in the encoder. Furthermore, if the encoder has used CABAC in order to perform entropy coding, the entropy decoding module 210 may perform entropy decoding using CABAC.

Information for generating a prediction block from among pieces of information decoded by the entropy decoding module 210, may be provided to the prediction module 230. Residual values on which entropy decoding has been performed by the entropy decoding module may be input to the reordering module 215.

The reordering module 215 may reorder the bit stream on which entropy decoding has been performed by the entropy decoding module 210 based on a reordering method used in the encoder. The reordering module 215 may reorder coefficients represented in a one-dimensional vector form by reconstructing the coefficients into coefficients of a two-dimensional block form. The reordering module 215 may receive information related to coefficient scanning performed by the encoder and perform reordering using an inverse scanning method based on a scanning order performed by the corresponding encoding unit.

The inverse quantization module 220 may perform inverse quantization based on quantization parameters and coefficient values of a block provided by the encoder.

As to DCT and DST performed by the transform module of the encoder, the inverse transform module 225 may perform inverse DCT and/or inverse DST on quantization results performed by the encoder. Inverse transform may be performed in a transmission unit or a partition unit of a picture as determined by the encoder. In the transform module of the encoder, DCT and/or DST may be selectively performed based on a plurality of factors, such as a prediction method, the size of the current block, and a prediction direction. The inverse transform module 225 of the video decoder may perform inverse transform based on transform information for the transform of the transform module in encoder.

The prediction module 230 may generate a prediction block based on information related to the generation of the prediction block provided by the entropy decoding module 210 and information on a previously decoded block and/or picture provided by memory 240. A reconstructed block may be generated using the prediction block generated by the prediction module 230 and the residual block provided by the inverse transform module 225. If the prediction mode used for the current PU is an intra-prediction mode, intra-prediction for generating a prediction block may be performed based on the information on pixels within the current picture.

If prediction mode for the current PU is inter-prediction mode, inter-prediction for the current PU may be performed based on information on at least one of a picture anterior to the current picture and a picture posterior to the current picture. Here, motion information necessary for the inter prediction for the current PU provided by the encoder, for example, information on a motion vector and a reference picture index, etc., may be derived corresponding to the information such as a skip flag or merge flag signaled from the encoder after checking the skip flag or the merge flag.

The reconstructed block and/or picture may be provided to the filter module 235. The filter module 235 may apply deblocking filtering, a sample adaptive offset (SAO) and/or adaptive loop filtering to the reconstructed block and/or picture.

The memory 240 may store the reconstructed picture or block so that the reconstructed picture or block may be used as a reference picture or a reference block and may also supply the reconstructed picture to an output unit.

Meanwhile, when prediction is performed by the encoder, information on prediction, for example, information on prediction mode and partition is signaled to the decoder. The signaling of information related to prediction may be performed by various methods. For example, when information related to prediction is signaled, information on the mode by which the motion information of a neighboring block which neighbors the current block (a neighboring block that neighbors the current block' is hereinafter referred to as a 'neighboring block', for convenience of description) is used as motion information for the current block mya be signaled prior to other information on the prediction as to the current block.

A method of using motion information on a neighboring block as motion information on the current block includes a method using a skip mode, a direct mode, or a merge mode. Motion information is not directly transmitted because the motion information of a neighboring block is used as motion information for the current block in all the three modes. However, residual information is not transmitted in a skip mode, whereas residual information may be transmitted in a direct mode and a merge mode. In a skip mode and a merge mode, however, information indicating that motion information on which neighboring block will be used as motion information for the current block may be transmitted.

A method of using (merge) skip mode or merge mode may be taken into consideration as another method of using information of a neighboring block for the prediction of the current block. In (merge) skip mode, one of candidate blocks neighboring the current block is selected and motion information of the selected block may be used as motion information for the current block, but a residual signal is not transmitted. Like in (merge) skip mode, in merge mode, one of candidate blocks neighboring the current block is selected and motion information of the selected block may be used as motion information for the current block, but residual information is in this case transmitted. Here, the residual information may be information on the difference between the pixel value of the current block and the pixel value of a prediction block that is generated based on a reference block indicated by the motion information of the selected block. If (merge) skip mode or merge mode is utilized, information indicating of which candidate block the current block uses motion information may be transmitted.

Although motion information of a neighboring block is not used as motion information for the current block, motion information of the current block may be predicted using motion information from the neighboring block. For example, the encoder may signal to the decoder information of the motion vector difference indicating a difference between the motion vector of the current block and the motion vector of a neighboring block, and the decoder may predict the motion information of the current block based on motion information from the neighboring block and the information provided by the encoder about the motion vector difference.

If mode does not correspond to skip mode, direct mode, or merge mode when the three modes are available, the encoder informs the decoder of prediction mode and partition information of the current block. If merge mode is performed in a CU unit, the encoder may not sigal to the decoder prediction mode and partition information of the current block. If merge mode is performed in a PU unit, the encoder may signal prediction mode and partition information of the current block to the decoder.

Even when (merge) skip mode or merge mode are performed, the same processing as that in skip mode, direct mode, or merge mode may be performed. For example, if mode does not correspond to (merge) skip mode and merge mode, the encoder may signal to the decoder both prediction mode and partition information for the current block. If merge mode is performed in a CU unit, the encoder may not signal to the decoder prediction mode and partition information of the current block. If merge mode is performed in a PU unit, however, the encoder may signal to the decoder prediction mode and partition information of the current block.

Accordingly, the encoder may signal to the decoder prediction mode and partition information for the current block except in a case where motion information on a neighboring block is not used as motion information on the current block in a CU unit.

Figure 3:
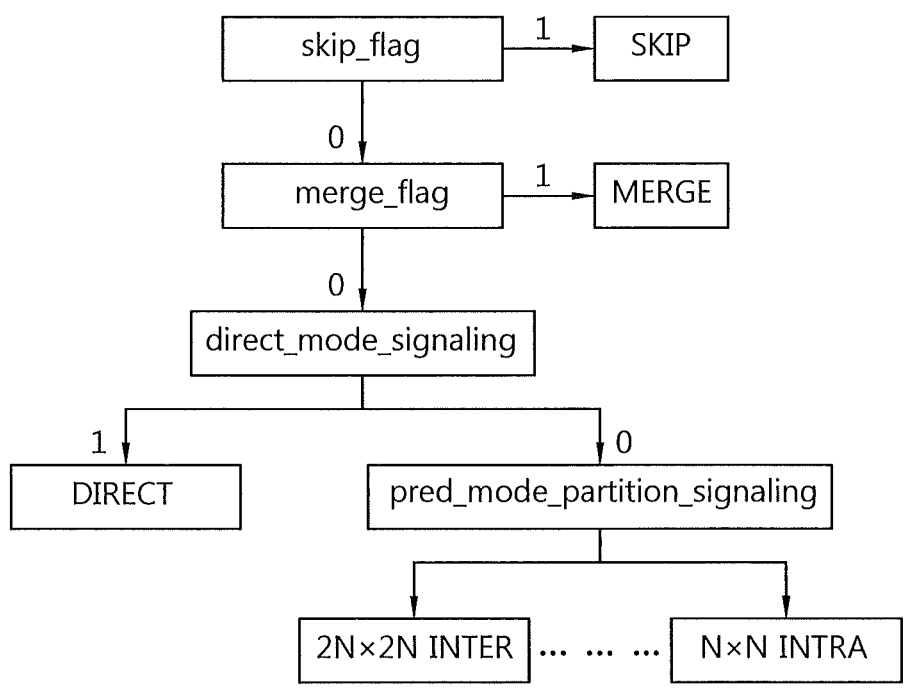
FIG. 3 schematically shows an example of a method of signaling information for prediction when merge mode is performed in a CU unit.

FIG. 3 schematically shows an example of a method of signaling information on prediction when merge mode is performed in a CU unit. FIG. 3 illustrates an example in which {skip mode, direct mode, merge mode} is used as mode in which motion information from a neighboring block is used as motion information for the current block.

Referring to FIG. 3, whether skip mode is applied to the current block or not may be indicated by a skip flag skip_flag, and whether merge mode is applied to the current block or not may be indicated by a merge flag merge_flag. Furthermore, whether direct mode is applied to the current block or not may be indicated by signaled information such as signaling direct_mode_signaling. If a prediction mode other than skip mode, merge mode, and direct mode is applied, prediction mode and partition information may be indicated through information, such as pred_mode_partition_signaling.

In the example of FIG. 3, first, whether prediction mode of the current block is skip mode or not can be determined by the skip flag skip_flag. For example, if the value of the skip_flag is 1, it can be determined that skip mode is applied to the current block. If the value of the skip_flag is 0, whether prediction mode of the current block is merge mode or not can be determined by the merge flag merge_flag. For example, if the value of the merge_flag is 1, it can be determined that merge mode is applied to the current block. If the value of the merge_flag is 0, whether prediction mode of the current block is direct mode or not can be determined by the signal direct_mode_signaling that indicates whether the prediction mode of the current block is direct mode or not. For example, if the value of the signal direct_mode_signaling is 1, it can be determined that direct mode is applied to the current block. If the value of the signal direct_mode_signaling is 0, prediction mode and partition information for the current block can be determined by the information disclosed by pred_mode_partition_signaling, which indicates the prediction mode and partition information for the current block. Here, the prediction mode and the partition information (e.g., a partition size) for the current block may be subject to joint coding at a time and subsequently signaled.

Information on prediction, such as prediction mode and a partition size, that is, prediction type, can be subject to joint coding and signaled as described above. Prediction mode may include intra mode and inter mode. The partition size may include 2N×2N and N×N (N being the number of samples) with regard to intra-prediction mode and may include 2N×2N, 2N×N, N×2N, N×N, 2N×nU, 2N×nD, nL×2N, and nR×2N (wherein 0<n<1 and each of U, D, L, and R is an integer indicating the number of samples) regarding inter-prediction mode.

Accordingly, a prediction type that can be indicated by the information pred_mode_partition_signaling may be the prediction type that has any one of the partitions {2N×2N, N×N} with intra-prediction mode or the prediction type that has any one of the partitions {2N×2N, 2N×N, N×2N, N×N, 2N×nU, 2N×nD, nL×2N, nR×2N} with inter-prediction mode.

Meanwhile, information on a prediction type, including information on prediction mode and partition, can be transmitted before and after the signaling of other pieces of information.

For example, information on a prediction type may be signaled after a slice type slice_type of the current block is signaled. If prediction mode of the current block is intra mode, information on a slice type may indicate an I slice. If prediction mode of the current block is inter mode, information on a slice type may indicate a B or P slice. The I slice refers to a slice decoded using only intra prediction, and the B slice refers to a slice decoded using either intra prediction or inter prediction that uses at most two motion vectors and reference indices. The P slice refers to a slice decoded using intra-prediction or inter-prediction that uses at most one motion vector and reference index.

Furthermore, information on a prediction type may be signaled after the signaling of whether the current block has been split or not (IntraSplitFlag). For example, if information on a prediction type is transmitted as a parameter regarding a CU, information indicating that the current block has not been split (IntraSplitFlag=0) or information indicating that the current block has been split (IntraSplitFlag=1) is transmitted and information on a prediction type may be then transmitted.

Accordingly, although the same index or the same codeword is allocated to the prediction types in which at least one of prediction mode and partition size is the same, the prediction type to be indicated may be specified based on information of a previously transmitted slice type and/or partition. For example, although same index or same codeword is allocated to 2N×2N intra prediction mode and 2N×2N inter prediction mode, the decoder may determine whether 2N×2N intra prediction mode has been indicated or whether 2N×2N inter prediction mode has been indicated because it has been previously signaled that a slice type is an 1 slice in the case of intra mode and it has been previously signaled that a slice type is a P or B slice in the case of inter mode.

Meanwhile, information on prediction mode in which motion information of a neighboring block is used as motion information for the current block, such as {skip mode, direct mode, merge mode} or {(merge) skip mode, merge mode}, as described above may be signaled separately without being subject to joint coding with information concerning another prediction type.

Furthermore, in the case of merge mode from among modes in which motion information of a neighboring block is used as motion information for the current block, information on whether of merging or not may be jointly coded with other pieces of information for mergence having a high frequency of occurrence and information on whether of merging or not may be signaled separately for mergence having a low frequency of occurrence without being jointly coded with other pieces of information, by taking frequency of occurrence into consideration. For example, only in the case of merging in a CU unit (i.e., CU mergence), information of the merging may be jointly coded with information on whether of applying intra/inter-prediction, and partition information, etc. and subsequently signaled. In the case of merging in a PU unit (i.e., PU mergence), information on whether of merging or not may be transmitted separately without being jointly coded with information on intra/inter-prediction and partition information, etc. A case where merging is performed in a CU unit and a case where merging is performed in a PU unit are separately described below.

Table 1 shows an example in which prediction mode and partition information for the current block are jointly coded according to the example shown in FIG. 3. For convenience of description, table 1 illustrates a case of the prediction types in which inter-prediction mode has one of the partitions {2N×2N, 2N×N, N×2N, N×N}.

TABLE 1

| PREDICTION MODE | PARTITION | CODEWORD |
| --- | --- | --- |
| INTRA | 2N × 2N | 00000 |
|  | N × N | 00001 |
| INTER | N × N | 0001 |
|  | 2N × 2N | 1 |
|  | 2N × N | 01 |
|  | N × 2N | 001 |

Referring to Table 1, the encoder may indicate which prediction mode is applied to the current block and which partition size the current block has through a codeword according to joint coding.

Meanwhile, if information on specific mode is first signaled and information on prediction mode and a partition size is then signaled as in FIG. 3 and Table 1, a codeword can be allocated by taking the frequency of occurrence of each prediction type into consideration.

Figure 4:
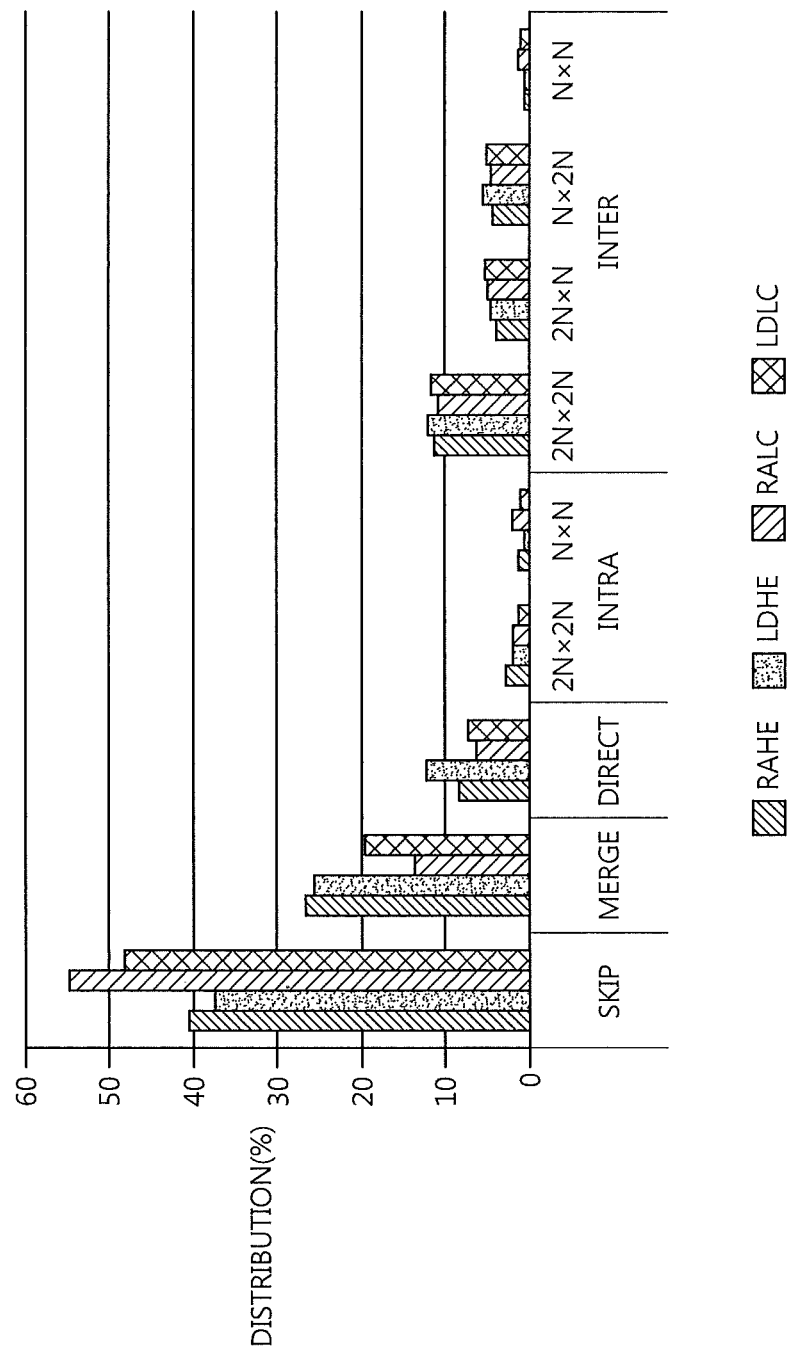
FIG. 4 is a diagram schematically showing the frequency of occurrence of each prediction type.

FIG. 4 is a diagram schematically showing the frequency of occurrence of each prediction type. FIG. 4 shows distributions of skip mode, merge mode, direct mode, the partition sizes of intra mode, and the partition sizes of inter mode in environments, that is, random access high efficiency (RAHE), low delay high efficiency (LDHE), random access low complexity (RALC), and low delay low complexity (LDLC).

Referring to FIG. 4, it can be seen that skip mode and merge mode have significant distributions of frequency of occurrence and direct mode has a smaller frequency of occurrence than 2N×2N inter prediction mode. In this case, in the signaling order shown in FIG. 3, it can be more efficient to signal information on whether 2N×2N inter prediction mode is applied or not prior to signal information on whether direct mode is applied or not.

In the example of FIG. 4, {skip mode, direct mode, merge mode} is used as the prediction mode in which motion information of a neighboring block is used as motion information for the current block and the frequency of occurrence of each of the partitions 2N×2N, 2N×N, N×2N, and N×N is measured. As in a case where {(merge) skip mode, merge mode} is used and/or all the partition sizes are used, each of the prediction modes and frequency of occurrence of can be taken into consideration, and the signaling order may be adjusted based on the consideration.

Figure 5:
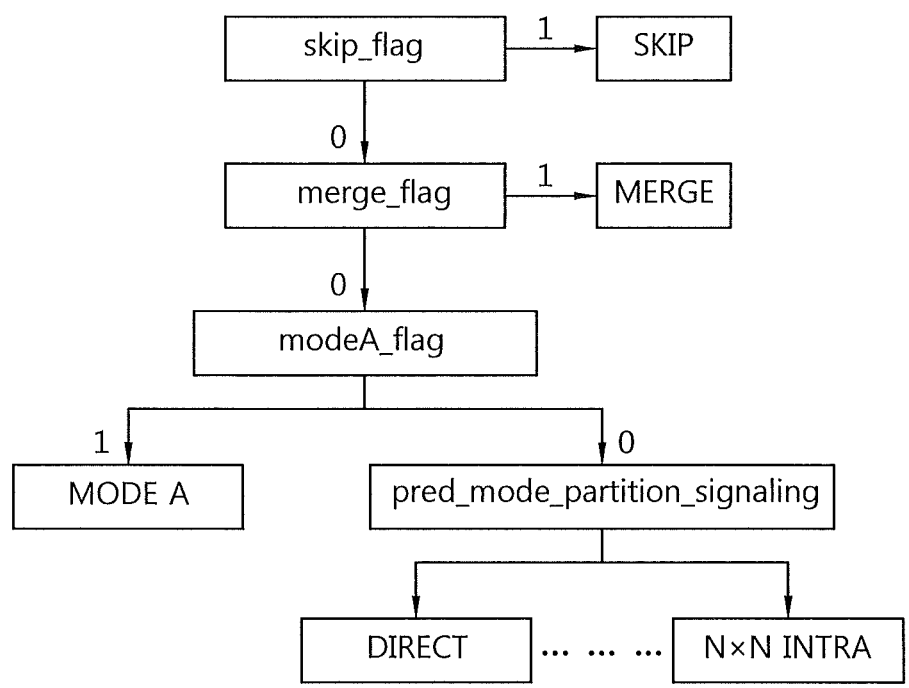
FIG. 5 is a diagram schematically illustrating an example of a method in which the encoder performs signaling in a system to which the present invention is applied.

FIG. 5 is a diagram schematically illustrating an example of a method in which the encoder performs signaling in a system to which the present invention is applied. FIG. 5 illustrates an example in which {skip mode, direct mode, merge mode} is used as prediction mode in which motion information on a neighboring block is used as motion information on the current block and merge mode is applied in a CU unit as in FIG. 3. Accordingly, regarding each partition size smaller than a coding unit (CU), information as for whether merge mode is applied or not is not signaled.

Referring to FIG. 4, a prediction mode/partition size having a higher selection ratio (i.e., frequency of occurrence) than direct mode may be present. Accordingly, when transmission overhead is considered, it can be advantageous to provide signaling information, so that whether another prediction mode (i.e., a prediction mode/partition size) having a higher selection ratio is applied or not can be determined first.

For example, assuming that a prediction mode/partition size having a higher frequency of occurrence than direct mode is mode A, information on whether mode A is applied or not may be transmitted prior to information on whether direct mode is applied or not.

In the example of FIG. 5, the encoder signals information on whether mode A is applied or not prior to information on whether direct mode is applied or not. In particular, the encoder first signals the skip flag skip_flag indicating whether skip mode is applied to the current block or not. The encoder may signal the merge flag merge_flag indicating whether merge mode is applied or not in the case where the skip mode is not applied, and signal information modeA_flag indicating whether mode A is applied or not in the case where the merge mode is not applied.

If mode A is not applied, the encoder signals information indicating whether which one of the remaining prediction modes/partition sizes and direct mode is applied to the current block. That is, the encoder signals information pred_mode_partition_signaling indicating what prediction type is applied to the current block besides skip mode, merge mode, and mode A.

Table 2 shows an example of a joint coding table in which a codeword is allocated to information on a prediction type according to the example of FIG. 5. Table 2 illustrates an example of prediction types in which inter-prediction mode can be applied with one of the partitions {2N×2N, 2N×N, N×2N, N×N} and merge mode is applied in a CU unit, for convenience of description.

TABLE 2

| PREDICTION MODE | PARTITION | CODEWORD |
| --- | --- | --- |
| DIRECT |  | 1 |
| INTRA | 2N × 2N | 00000 |
|  | N × N | 00001 |
| INTER | N × N | 0001 |
|  | 2N × N | 01 |
|  | N × 2N | 001 |

In the example of Table 2, it is assumed that mode A is 2N×2N inter mode, for convenience of description. Accordingly, information on 2N×2N inter prediction mode is first signaled without using the joint coding table, and information indicating whether direct mode is applied or not is signaled using the joint coding table together with other prediction types.

In addition to changing transmission order by taking the frequency of occurrence of a prediction type into consideration as in the example of FIG. 5, the codewords may be allocated to the prediction types by taking the frequency of occurrence of each prediction type into consideration.

Table 3 shows an example of a joint coding table in which a codeword is allocated by taking the frequency of occurrence of each prediction type into consideration. Table 3 illustrates an example of prediction types in which inter-prediction mode can be applied with one of the partitions {2N×2N, 2N×N, N×2N, N×N} and merge mode is applied in a CU unit, for convenience of description.

TABLE 3

| PREDICTION MODE | PARTITION | CODEWORD |
| --- | --- | --- |
| INTRA | 2N × 2N | 00000 |
|  | N × N | 00001 |
| INTER | N × N | 0001 |
|  | 2N × 2N | 1 |
|  | 2N × N | 001 |
|  | N × 2N | 01 |

In the example of Table 3, it is assumed that 2N×N inter prediction mode has a higher frequency of occurrence than N×2N inter prediction mode, for convenience of description. As compared with the case of Table 1, in Table 3, codewords allocated to 2N×N inter prediction mode and N×2N inter prediction mode are changed by taking the frequency of occurrence of a prediction type into consideration. In particular, assuming that 2N×N inter prediction mode has a lower frequency of occurrence than N×2N inter prediction mode, a shorter codeword 01 is allocated to N×2N inter prediction mode, which has a higher frequency of occurrence and a longer codeword 001 is allocated to 2N×N inter prediction mode, which has a lower frequency of occurrence.

Here, the frequency of occurrence of a prediction type may be incorporated into both the signaling order and the allocation of the codewords.

Table 4 shows an example of a joint coding table in a case where a signaling order is adjusted and codewords are allocated by taking the frequency of occurrence of a prediction type into consideration. Table 4 illustrates an example of prediction types in which inter-prediction mode can be applied with one of the partitions {2N×2N, 2N×N, N×2N, N×N} and merge mode is applied in a CU unit, for convenience of description.

TABLE 4

| PREDICTION MODE | PARTITION | CODEWORD |
| --- | --- | --- |
| DIRECT |  | 1 |
| INTRA | 2N × 2N | 00000 |
|  | N × N | 00001 |
| INTER | N × N | 0001 |
|  | 2N × N | 001 |
|  | N × 2N | 01 |

In the example of Table 4, it is assumed that 2N×2N inter prediction mode has a higher frequency of occurrence than direct mode and N×2N inter prediction mode has a higher frequency of occurrence than 2N×N inter prediction mode, for convenience of description. Accordingly, information indicating whether 2N×2N inter prediction mode is applied is signaled prior to information indicating whether direct mode is applied. Information indicating whether direct mode is applied or not is signaled, together with other prediction types, using the joint coding table of Table 4. Here, a codeword 01, being smaller than the codeword 001 of 2N×N inter prediction mode, is allocated to N×2N inter prediction mode, which has a higher frequency of occurrence than 2N×N inter prediction mode.

Meanwhile, regarding specific prediction mode from among prediction modes in which motion information of a neighboring block is used as motion information for the current block, information on whether the specific prediction mode is applied may be signaled separately, and information on whether other prediction types are applied may be signaled through joint coding. Accordingly, whether skip mode is applied or not can be signaled separately, and whether merge mode is applied and whether direct mode is applied can be signaled through joint coding along with information on whether other prediction types are applied. In some embodiments, whether merge mode is applied may be signaled separately, and whether skip mode is applied and whether direct mode is applied may be signaled through joint coding along with information on whether other prediction types are applied. Likewise, whether direct mode is applied or not may be signaled separately, and whether skip mode is applied and whether merge mode is applied may be signaled through joint coding along with whether other prediction types are applied.

Furthermore, whether skip mode is applied and whether merge mode is applied can be signaled separately, and whether direct mode is applied can be signaled through joint coding along with whether other prediction types are applied. Whether skip mode is applied and whether direct mode is applied can be signaled separately, and whether merge mode is applied can be signaled through joint coding along with whether other prediction types are applied. In some embodiments, whether merge mode is applied and whether direct mode is applied can be signaled separately, and whether skip mode is applied can be signaled through joint coding along with whether other prediction types are applied.

Even in a case where {merge skip mode, merge mode} is used instead of {skip mode, direct mode, merge mode}, whether skip merge mode is applied can be signaled separately and whether merge mode is applied can be signaled through joint coding along with whether other prediction types are applied. In some embodiments, whether merge mode is applied can be signaled separately, and whether (merge) skip mode is applied can be signaled through joint coding along with whether other prediction types are applied.

Table 5 shows an example of a joint coding table that is used to signal whether specific prediction mode, from among prediction modes in which motion information on a neighboring block is used as motion information on the current block, is applied and whether other prediction types are applied. Table 5 illustrates an example in which whether direct mode is applied is signaled through joint coding along with whether other prediction types are applied in a case where {skip mode, direct mode, merge mode} is used. Table 5 illustrates an example of prediction type in which inter-prediction mode can be applied with the partitions {2N×2N, 2N×N, N×2N, N×N} and merge mode is applied in a CU unit, for convenience of description.

TABLE 5

| PREDICTION MODE | PARTITION | CODEWORD |
|---|---|---|
| DIRECT | | 1 |
| INTRA | 2N × 2N | 000000 |
| | N × N | 000001 |
| INTER | N × N | 00001 |
| | 2N × 2N | 01 |
| | 2N × N | 001 |
| | N × 2N | 0001 |

Referring to Table 5, the encoder may indicate a prediction type for the current block by sending a codeword corresponding to the prediction type applied to the current block.

At this time, the encoder may allocate the codeword depending on the frequency of occurrence of each prediction type.

Table 6 shows an example of a joint coding table in which codewords are allocated by taking frequency of occurrence into consideration, assuming that 2N×2N inter prediction mode has a higher frequency of occurrence than direct mode.

TABLE 6

| PREDICTION MODE | PARTITION | CODEWORD |
|---|---|---|
| DIRECT | | 01 |
| INTRA | 2N × 2N | 000000 |
| | N × N | 000001 |
| INTER | N × N | 00001 |
| | 2N × 2N | 1 |
| | 2N × N | 001 |
| | N × 2N | 0001 |

Referring to Table 6, a codeword 1, being smaller than the codeword 01 of direct mode, is allocated to 2N×2N inter prediction mode, which has a higher frequency of occurrence.

Table 7 shows an example in which codewords are allocated by taking frequency of occurrence into consideration, assuming that 2N×N inter prediction mode, from among the other inter prediction modes, has a lower frequency of occurrence than N×2N inter prediction mode.

TABLE 7

| PREDICTION MODE | PARTITION | CODEWORD |
|---|---|---|
| DIRECT | | 01 |
| INTRA | 2N × 2N | 000000 |
| | N × N | 000001 |
| INTER | N × N | 00001 |
| | 2N × 2N | 1 |
| | 2N × N | 0001 |
| | N × 2N | 001 |

Referring to Table 7, a codeword 1, being smaller than a codeword 01 allocated to direct mode, is allocated to 2N×2N inter prediction mode having a higher frequency of occurrence, and a codeword 001, being smaller than a codeword 0001 allocated to 2N×N inter prediction mode, is allocated to N×2N inter prediction mode.

Figure 6:
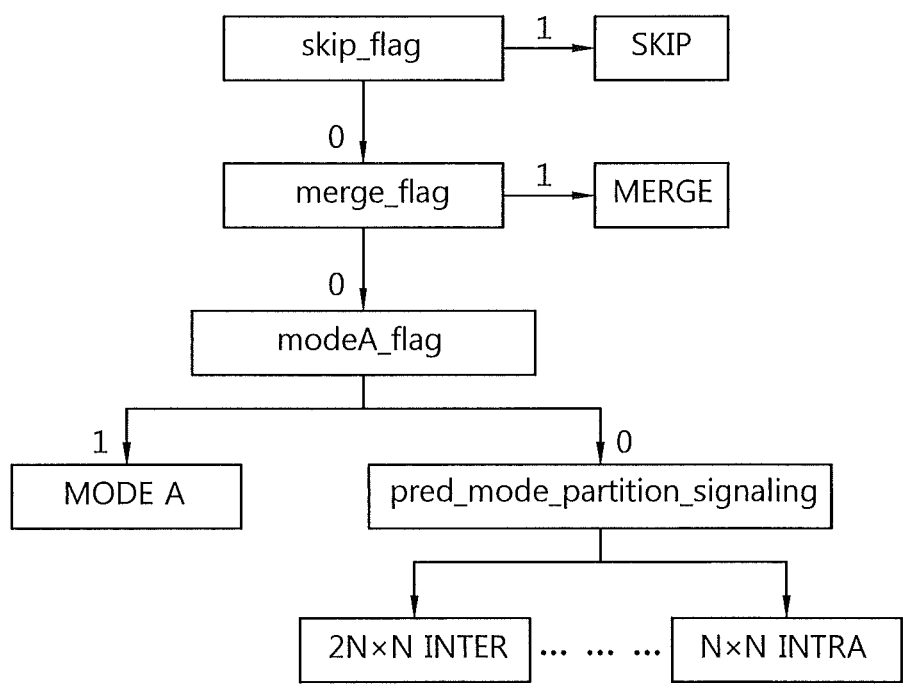
FIG. 6 is a diagram schematically illustrating another example of a method in which the encoder performs signaling in a system to which the present invention is applied.

FIG. 6 is a diagram schematically illustrating another example of a method in which the encoder performs signaling in a system to which the present invention is applied. FIG. 6 illustrates an example in which direct mode is not applied as prediction mode in which motion information of a neighboring block is used as motion information for the current block, that is, {(merge) skip mode, merge mode} is used, and merge mode is applied in a CU unit. Accordingly, whether merge mode is applied is not signaled per each partition size smaller than a CU.

When comparing the embodiment of FIG. 6 with the embodiment of FIG. 3 or 5, the number of pieces of information on whether prediction modes in which motion information of a neighboring block is used as motion information for the current block is applied is reduced by one. That is, it can be said that the embodiment of FIG. 3 or 5 corresponds to a case where there is no direct mode. If direct mode is excluded in the embodiment of FIG. 3 or 5, it can be said that signaling overhead for subsequent signaling on inter/intra prediction modes is reduced. Accordingly, if (merge) skip mode and merge mode are used as in the case of FIG. 6, signaling overhead can be reduced as compared with the case demonstrated by FIG. 3 or 5.

Even when {(merge) skip mode, merge mode} is used, a prediction type can be signaled identical to the case where {skip mode, direct mode, merge mode} is used. For example, even in the case of FIG. 6, assuming that prediction mode or a prediction type having a high selection ratio (or frequency of occurrence) is mode A, as indicated from among prediction types other than (merge) skip mode and merge mode, information modeA_flag on whether mode A is applied can be signaled prior to information is signaled regarding whether other prediction types e.g. 2N×2N inter prediction mode, . . . , N×N intra prediction mode are applied. Furthermore, if mode A is not applied, whether other prediction types e.g. 2N×2N inter prediction mode, . . . , N×N intra prediction mode are applied can be signaled through joint coding.

Table 8 shows an example of a joint coding table in which a codeword is allocated to information on a prediction type based on the example of FIG. 6. Table 8 illustrates an example in which inter-prediction mode can be applied with one of the partitions {2N×2N, 2N×N, N×2N, N×N} and merge mode is applied in a CU unit, for convenience of description.

TABLE 8

| PREDICTION MODE | PARTITION | CODEWORD |
|---|---|---|
| INTRA | 2N × 2N | 0000 |
|  | N × N | 0001 |
| INTER | N × N | 001 |
|  | 2N × N | 1 |
|  | N × 2N | 01 |

In the example of Table 8, it is assumed that a prediction type having the highest frequency of occurrence, from among inter prediction modes with one of the partitions 2N×2N, 2N×N, N×2N, and N×N, that is, mode A, is 2N×2N inter prediction mode, for convenience of description. Accordingly, whether 2N×2N inter prediction mode is applied is transmitted in advance through separate signaling.

In addition to the case where transmission order is determined by taking the frequency of occurrence of a prediction type into consideration as in the example of FIG. 6, codeword may be allocated to the prediction type by taking the frequency of occurrence (or a selection ratio) into consideration.

Table 9 shows an example of a joint coding table in which codewords are allocated by taking the frequency of occurrence of a prediction type into consideration, in a case where {(merge) skip mode, merge mode} is used. Table 9 illustrates an example in which inter prediction mode can be applied with one of the partitions {2N×2N, 2N×N, N×2N, N×N} and merge mode is applied in a CU unit, for convenience of description.

TABLE 9

| PREDICTION MODE | PARTITION | CODEWORD |
|---|---|---|
| INTRA | 2N × 2N | 00000 |
|  | N × N | 00001 |
| INTER | N × N | 0001 |
|  | 2N × 2N | 1 |
|  | 2N × N | 001 |
|  | N × 2N | 01 |

Referring to Table 9, a shorter codeword is allocated to N×2N inter prediction mode, assuming that N×2N inter prediction mode has a higher frequency of occurrence than 2N×N inter prediction mode.

Furthermore, even when {(merge) skip mode, merge mode} is used, the frequency of occurrence of a prediction type can be incorporated into both the signaling order and the allocation of the codewords.

Table 10 shows an example of a joint coding table in which signaling order is adjusted and codewords are allocated by taking the frequency of occurrence of a prediction type into consideration, as in a case where {(merge) skip mode, merge mode} is used. Table 10 illustrates an example of prediction type in which inter prediction mode can be applied with one of the partitions {2N×2N, 2N×N, N×2N, N×N} and merge mode is applied in a CU unit, for convenience of description.

TABLE 10

| PREDICTION MODE | PARTITION | CODEWORD |
|---|---|---|
| INTRA | 2N × 2N | 0000 |
|  | N × N | 0001 |
| INTER | N × N | 001 |
|  | 2N × N | 01 |
|  | N × 2N | 1 |

In the example of Table 10, it is assumed that 2N×2N inter prediction mode, from among 2N×2N, 2N×N, N×2N, N×N inter prediction modes, has the highest frequency of occurrence and 2N×N inter prediction mode has a higher frequency of occurrence than N×2N inter prediction mode, for convenience of description. Accordingly, at first whether (merge) skip mode is applied, whether merge mode is applied, and whether 2N×2N inter prediction mode is applied may be signaled through separate signalings, and whether other prediction types are applied is signaled using the joint coding table of Table 10. Here, a codeword 1 being smaller than the codeword 01 of 2N×N inter prediction mode is allocated to N×2N inter prediction mode, which has a higher frequency of occurrence than 2N×N inter prediction mode.

Meanwhile, if {skip mode, direct mode, merge mode} is used as prediction modes in which motion information of a neighboring block is used as motion information for the current block, direct mode and merge mode may be integrated and used. Direct mode and merge mode are similar to each other in that motion information is derived from a neighboring block and, unlike skip mode, residual information is transmitted. If direct mode and merge mode are integrated, signaling overhead for signaling information on whether inter/intra prediction modes are applied, which is signaled after signaling information on whether mode in which direct mode and merge mode are integrated (hereinafter referred to as 'integration mode', for convenience of description) is applied, can be reduced. Even when integration mode is applied, signaling order may be adjusted and the allocation of codewords may be adjusted as described above.

Figure 7:
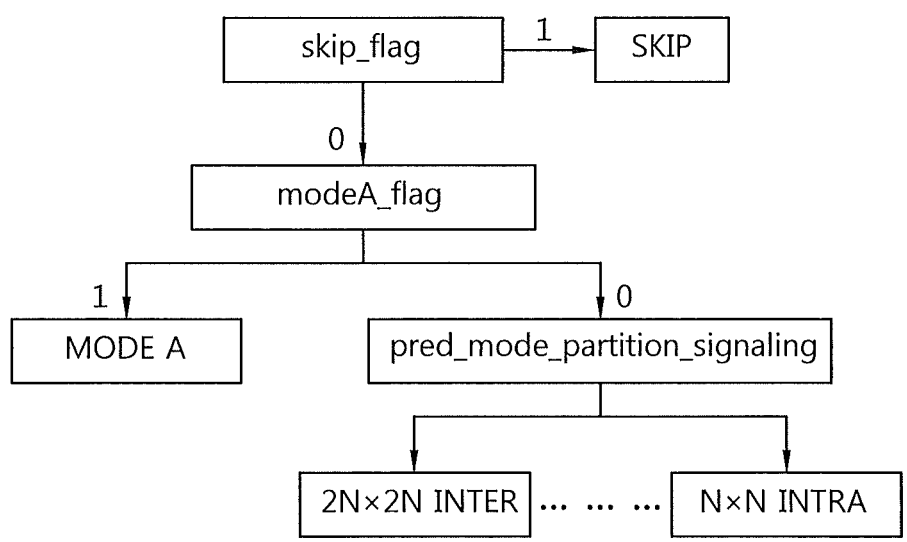
FIGS. 7 and 8 are diagrams schematically illustrating other examples of a method in which the encoder performs signaling in a system to which the present invention is applied.
Figure 8:
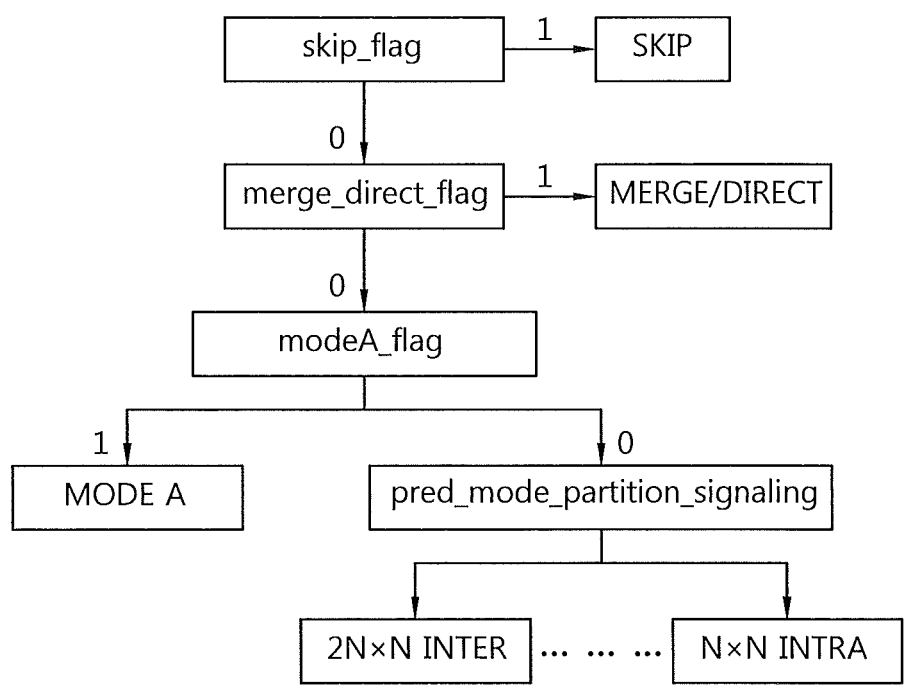

FIGS. 7 and 8 are diagrams schematically illustrating other examples of a method in which the encoder performs signaling in a system to which the present invention is applied. FIGS. 7 and 8 illustrate examples in which integration mode is used, but merge mode is applied in a CU unit. Accordingly, whether merge mode is applied is not signaled per each partition size smaller than a CU.

In the example of FIG. 7, if skip mode is not applied after the signaling of whether skip mode is applied, information on whether a prediction type having the highest frequency of occurrence from among the remaining prediction types is applied may be preferentially signaled.

In FIG. 7, mode A is assumed to be a prediction type having the highest frequency of occurrence among the remaining prediction types, excluding skip mode. Accordingly, the encoder signals whether mode A is applied or not if skip mode is not applied and the encoder signals which one of the remaining prediction types (including a prediction mode/partition size) will be applied through joint coding, e.g. pred_mode_partition_signaling, if mode A is not applied.

Table 11 shows a joint coding table according to the example of FIG. 7.

TABLE 11

| PREDICTION MODE | PARTITION | CODEWORD |
|---|---|---|
| INTRA | 2N × 2N | 00000 |
|  | N × N | 00001 |
| INTER | N × N | 0001 |
|  | 2N × 2N | 1 |
|  | 2N × N | 01 |
|  | N × 2N | 001 |

In the examples of FIG. 7 and Table 11, if skip mode is not applied after signaling of whether skip mode is applied or not, whether integration mode is applied can be signaled as a prediction type having the highest frequency of occurrence. If integration mode is not applied, which prediction type is applied can be signaled using a result in which pieces of information on the prediction modes and partition of the remaining prediction types are jointly coded, as in Table 11. Meanwhile, FIG. 7 and Table 11 illustrate that a prediction type having the highest frequency of occurrence is integration mode except skip mode, but this is only an example for convenience of description. The present invention is not limited to the above example. For example, if 2N×2N inter prediction mode has a higher frequency of occurrence than integration mode, 2N×2N inter prediction mode may be determined as mode A. In this case, after whether 2N×2N inter prediction mode is applied or not is signaled, whether integration mode is applied or not may be signaled through joint coding along with other prediction types.

Unlike FIG. 7, FIG. 8 illustrates a method of separately signaling whether integration mode is applied or not (merge_direct_flag) in advance if skip mode is not applied, and separately signaling on whether a prediction type (i.e., mode A) having the highest frequency of occurrence from among other prediction types (modeA_flag) in advance if integration mode is not applied. If mode A is not applied, which one of other prediction modes is applied is signaled through joint coding (pred_mode_partition_signaling) as in FIG. 7.

Table 12 shows a joint coding table according to the example of FIG. 8.

TABLE 12

| PREDICTION MODE | PARTITION | CODEWORD |
|---|---|---|
| INTRA | 2N × 2N | 0000 |
|  | N × N | 0001 |
| INTER | N × N | 001 |
|  | 2N × N | 1 |
|  | N × 2N | 01 |

In the example of Table 12, it is assumed that 2N×2N inter prediction mode is mode A, for convenience of description. Accordingly, whether 2N×2N inter prediction mode is applied or not can be separately signaled in advance.

Meanwhile, if joint coding is performed separately from the adjusting the signaling order as described above, codewords can be applied by taking the frequency of occurrence (or a selection ratio) of each prediction type.

Table 13 shows an example of a joint coding table in which codewords are allocated by taking the frequency of occurrence of a prediction type into consideration, in a case where integration mode is used. Table 13 illustrates an example of prediction type in which inter prediction mode can be applied with one of the partitions {2N×2N, 2N×N, N×2N, N×N} and merge mode is applied in a CU unit, for convenience of description.

TABLE 13

| PREDICTION MODE | PARTITION | CODEWORD |
|---|---|---|
| INTRA | 2N × 2N | 00000 |
|  | N × N | 00001 |
| INTER | N × N | 0001 |
|  | 2N × 2N | 1 |
|  | 2N × N | 001 |
|  | N × 2N | 01 |

Table 13 illustrates an example in which N×2N inter prediction mode has a higher frequency of occurrence than 2N×N inter prediction mode. Accordingly, in the example of Table 13, a codeword 01 is allocated to N×2N inter prediction mode, being shorter than a codeword 001 allocated to 2N×N inter prediction mode.

Furthermore, signaling order may be adjusted as in FIG. 8 and a codeword may be allocated as in Table 13 by taking the frequency of occurrence of each prediction type into consideration.

Table 14 shows an example of a joint coding table in which signaling order is adjusted and codewords are allocated by taking the frequency of occurrence of a prediction type into consideration, in a case where integration mode is used. Table 14 illustrates an example of prediction type in which inter prediction mode can be applied with one of the partitions {2N×2N, 2N×N, N×2N, N×N} and merge mode is applied in a CU unit, for convenience of description.

TABLE 14

| PREDICTION MODE | PARTITION | CODEWORD |
|---|---|---|
| INTRA | 2N × 2N | 0000 |
|  | N × N | 0001 |
| INTER | N × N | 001 |
|  | 2N × N | 01 |
|  | N × 2N | 1 |

In the example of Table 14, it is assumed that prediction mode corresponding to mode A of FIG. 8 is 2N×2N inter prediction mode and N×2N inter prediction mode has a higher frequency of occurrence than 2N×N inter prediction mode, for convenience of description. Accordingly, if integration mode is not applied after whether integration mode is applied or not is signaled, whether 2N×2N inter mode is applied or not is signaled through separate signaling. Furthermore, a codeword 1 is allocated to N×2N inter prediction mode, being shorter than a codeword 01 allocated to 2N×N inter prediction mode.

Furthermore, even when integration mode is used, which prediction type from among prediction types except skip mode is applied may be signaled concurrently through joint coding (pred_mode_partition_signaling). That is, a codeword can be allocated to each of prediction types including integration mode, and a codeword corresponding to an applied prediction type can be signaled.

Table 15 schematically shows an example of a joint coding table that is used to send information on a prediction type (e.g., prediction mode and a partition size) applied to the current block by allocating a codeword to each of prediction types other than skip mode, in a case where integration mode is used.

TABLE 15

| PREDICTION MODE | PARTITION | CODEWORD |
| --- | --- | --- |
| MRG/DIRECT | | 1 |
| INTRA | 2N × 2N | 000000 |
| | N × N | 000001 |
| INTER | N × N | 00001 |
| | 2N × 2N | 01 |
| | 2N × N | 001 |
| | N × 2N | 0001 |

Table 15 illustrates an example in which inter prediction mode can be applied with one of the partitions {2N×2N, 2N×N, N×2N, N×N} and merge mode is applied in a CU unit, for convenience of description. Referring to Table 15, the encoder may allocate a codeword to each of prediction modes, that is, integration mode (i.e., merge/direct mode), 2N×2N and N×N intra prediction modes, and 2N×2N, 2N×N, N×2N, and N×N inter prediction modes, and sends the codeword of the prediction type applied to the current block.

Here, the encoder may allocate the codewords by taking the frequency of occurrence of each prediction type (or a selection ratio) into consideration.

Table 16 shows an example in which codewords are allocated by taking the frequency of occurrence of each prediction type into consideration in the example of Table 15.

TABLE 16

| PREDICTION MODE | PARTITION | CODEWORD |
| --- | --- | --- |
| MERGE/DIRECT | | 1 |
| INTRA | 2N × 2N | 000000 |
| | N × N | 000001 |
| INTER | N × N | 00001 |
| | 2N × 2N | 01 |
| | 2N × N | 0001 |
| | N × 2N | 001 |

In the example of Table 16, it is assumed that N×2N inter prediction mode has a higher frequency of occurrence than 2N×N inter prediction mode, for convenience of description. Accordingly, unlike in the example of Table 15, in the example of Table 16, a codeword 001 is allocated to N×2N inter prediction mode, being shorter than a codeword 0001 allocated to 2N×N inter prediction mode.

Only cases where the partitions {2N×2N, 2N×N, N×2N, N×N} are applied to inter mode have been described in the aforementioned examples, for convenience of description, but a prediction type for the current block may be signaled by taking all the partitions for inter mode into consideration.

Table 17 shows an example of a joint coding table that can be used to signal a prediction block for the current block in a case where all partitions 2N×2N, 2N×N, N×2N, N×N, 2N×nU, 2N×nD, nL×2N, and nR×2N are taken into consideration.

TABLE 17

| pred_type | PredMode | PartMode |
| --- | --- | --- |
| 0 | MODE_INTRA | PART_2N × 2N |
| 1 | MODE_INTRA | PART_N × N |
| 0 | MODE_INTER | PART_2N × 2N |
| 1 | MODE_INTER | PART_2N × N |
| 2 | MODE_INTER | PART_N × 2N |
| 3 | MODE_INTER | PART_N × N |
| 4 | MODE_INTER | PART_2N × nU |
| 5 | MODE_INTER | PART_2N × nD |
| 6 | MODE_INTER | PART_nL × 2N |
| 7 | MODE_INTER | PART_nR × 2N |
| 8 | MODE_INTRA | PART_2N × 2N |
| 9 | MODE_INTRA | PART_N × N |

Referring to Table 17, each partition size of intra prediction mode and each partition size of inter prediction mode can be indicated through a prediction type. Accordingly, prediction mode and a partition size may be jointly coded, and a prediction type for the current block may be signaled at once. Here, codewords may be allocated by taking frequency of occurrence into consideration for each prediction type as described above.

Meanwhile, in the example of Table 17, in the case of prediction mode in which motion information of a neighboring block is used as motion information for the current block without change, for example, in the case of {skip mode, direct mode, merge mode} or {(merge) skip mode, merge mode}, which mode is applied may be inferred based on other conditions or which mode is applied or not may have been sent prior through separate signaling. In addition, in the example of Table 17, it is assumed that merge mode is applied in a CU unit as in the above-described examples, and whether merge mode is applied or not is not again signaled for each partition.

Furthermore, prior to the signaling of each prediction type, pieces of additional information described above, such as information on a slice type or partition, may be signaled. In this case, the prediction types may be distinguished from one another based on the pieces of additional information. For example, in the case of an I slice, 2N×2N intra prediction mode may be indicated if the value of a prediction type is 0. In the case of a B or P slice, 2N×2N inter prediction mode may be indicated if the value of a prediction type is 0.

Furthermore, the prediction types may be distinguished from one another by allocating different codewords to prediction types having different prediction modes/partitions.

Meanwhile, the case where merge mode is applied in a CU unit have been described so far, but merge mode may be applied in a PU unit. For example, in each of the examples described so far, the features of the present invention described in the above examples can be applied without change to a case where merge mode is performed in a PU unit by signaling whether merge mode is applied to each of the partitions of inter prediction mode.

Methods of applying the present invention when merge mode is performed in a PU unit are described in detail below.

Figure 9:
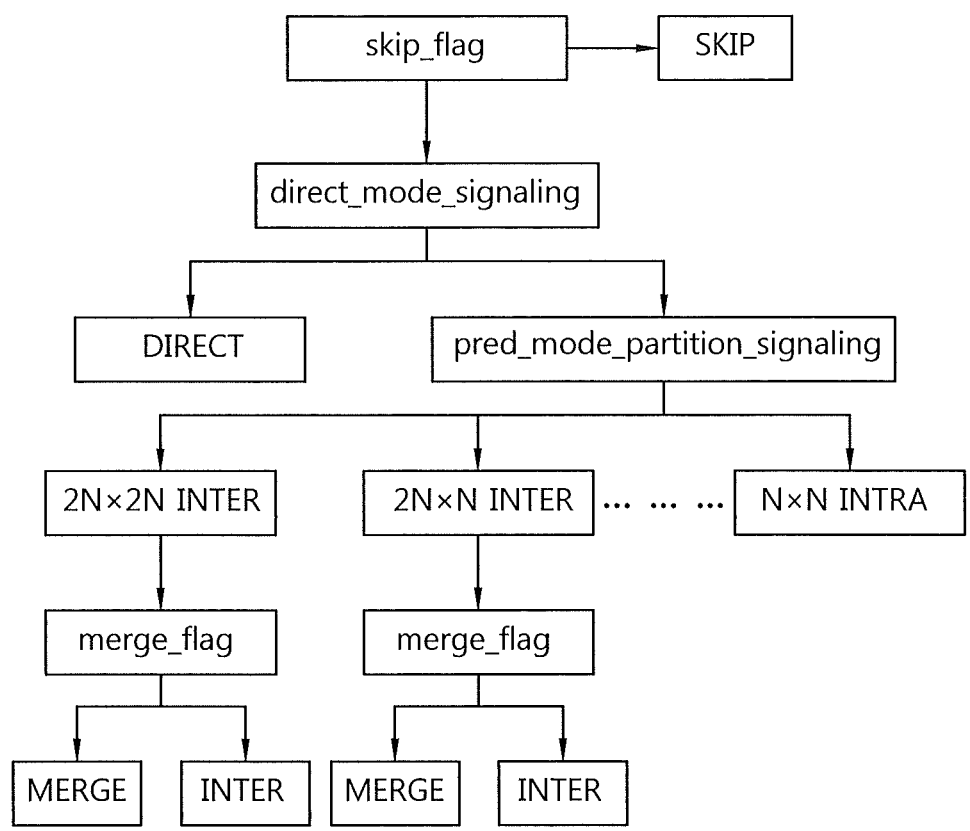
FIG. 9 schematically shows an example of a method of signaling information on prediction when a merge mode is performed in a PU unit.

FIG. 9 schematically shows an example of a method of signaling information on prediction when merge is performed in a PU unit. FIG. 9 illustrates an example in which {skip mode, direct mode, merge mode} is used as prediction mode in which motion information of a neighboring block is used as motion information for the current block.

In the example of FIG. 9, unlike in the example of FIG. 3, if skip mode and direct mode are not applied, which inter prediction mode and partition are applied to the current block is indicated and whether the partition is merged or not is signaled. Whether skip mode and direct mode are applied or not is separately signaled in advance, and which prediction mode/partition to be applied if skip mode and direct mode are not applied is signaled by jointly coding the indication of prediction mode and information on a partition size. Whether merge mode is applied to each partition with inter prediction is indicated through merge mode. Here, inter prediction mode performed when merge mode is not applied is referred to as normal inter mode, for convenience of description.

Table 18 shows an example in which prediction mode information and partition information for the current block are jointly coded according to the example of FIG. 9. Table 18 illustrates an example in which inter prediction mode can be applied with one of the partitions {2N×2N, 2N×N, N×2N, N×N}, for convenience of description.

TABLE 18

| PREDICTION MODE | PARTITION | CODEWORD |
| --- | --- | --- |
| INTRA | 2N × 2N | 00000 |
|  | N × N | 00001 |
| INTER | N × N | 0001 |
|  | 2N × 2N | 1 |
|  | 2N × N | 01 |
|  | N × 2N | 001 |

Referring to Table 18, the encoder can inform the decoder of a prediction type applied to the current block by signaling a codeword.

Meanwhile, if information on specific mode is first signaled and information on prediction mode and a partition size is then signaled as in FIG. 9 and Table 18, a codeword may be allocated by taking the frequency of occurrence of each prediction type into consideration.

Figure 10:
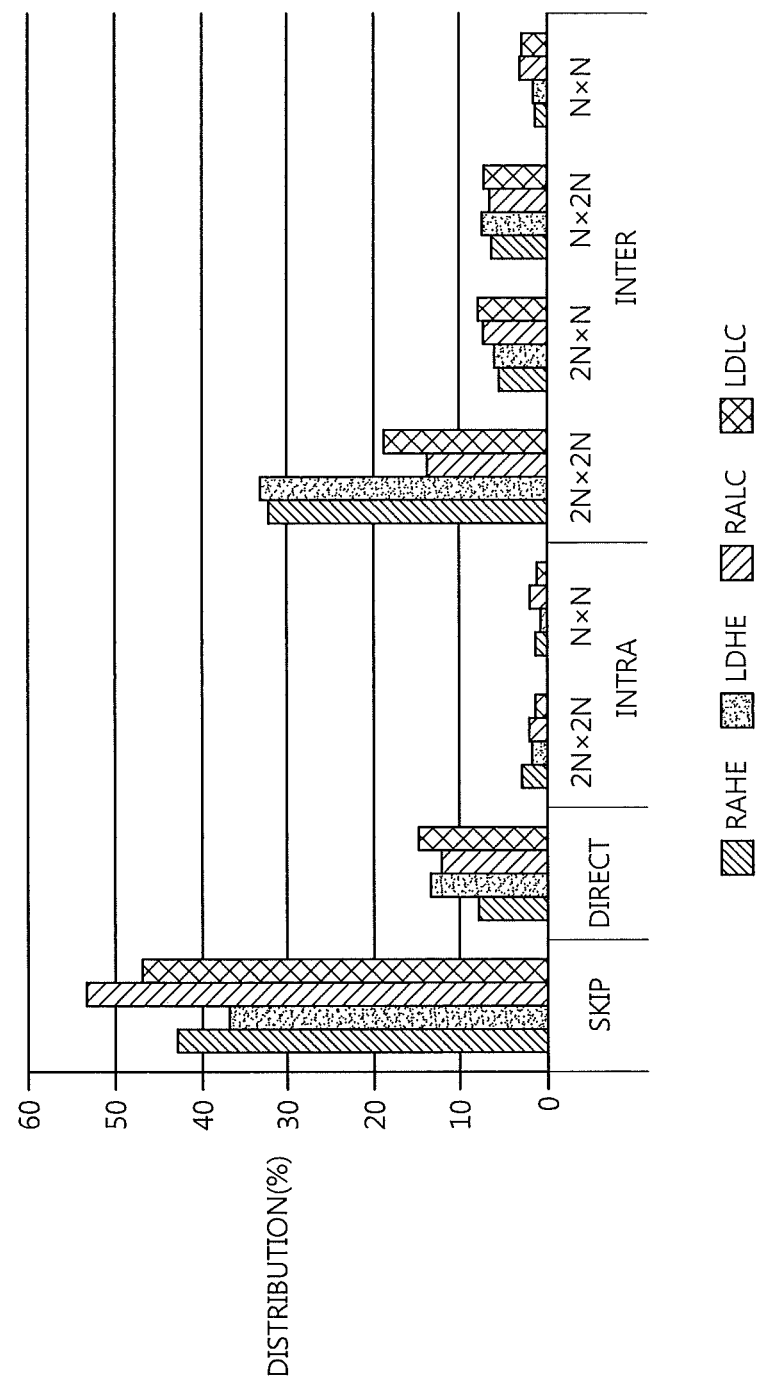
FIG. 10 is a diagram schematically showing the frequency of occurrence of each prediction type when a merge mode is applied in a PU unit.

FIG. 10 is a diagram schematically showing the frequency of occurrence of each prediction type when merge mode is applied in a PU unit. FIG. 10 shows distributions of skip mode, merge mode, direct mode, and the partition sizes of intra prediction mode and the partition sizes of inter prediction mode in the case of RAHE, LDHE, RALC, and LDLC.

Referring to FIG. 10, skip mode has a significant frequency distribution, and direct mode has a lower frequency of occurrence than 2N×2N inter prediction mode. In this case, it will be more efficient to signal information indicating whether 2N×2N inter prediction mode is applied or not than to signal information indicating whether direct mode is applied or not as per the signaling order shown in FIG. 9.

In the example of FIG. 10, {skip mode, direct mode, merge mode} was used and the frequencies of occurrence of 2N×2N, 2N×N, N×2N, N×N from among partition sizes were measured. However, even when {(merge) skip mode, merge mode} is used and/or all partition sizes are used, the frequency of occurrence of each prediction mode and partition size can be taken into consideration and signaling order can be adjusted based on the consideration.

Figure 11:
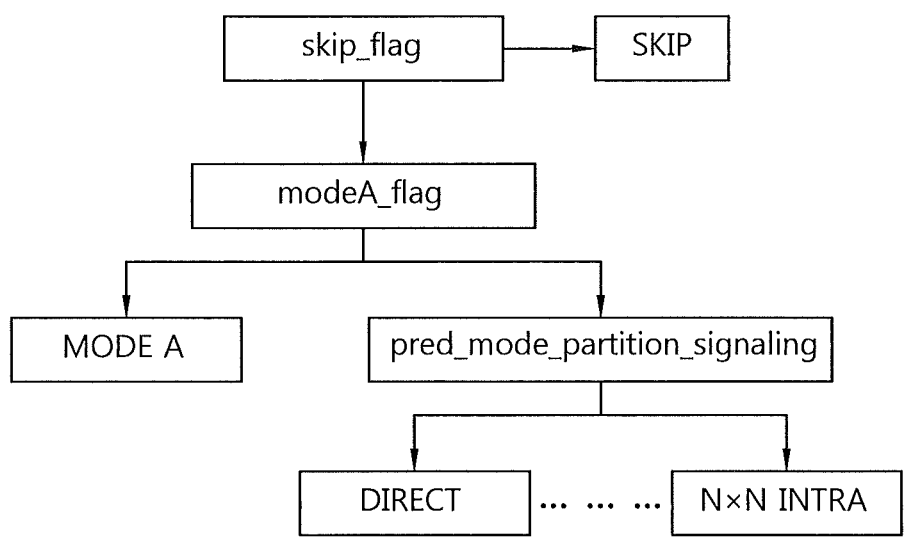
FIG. 11 is a diagram schematically illustrating an example of a method in which the encoder performs signaling in a system to which the present invention is applied.

FIG. 11 is a diagram schematically illustrating an example of a method in which the encoder performs signaling in a system to which the present invention is applied. In FIG. 11, {skip mode, direct mode, merge mode} is used as prediction mode in which motion information of a neighboring block is used as motion information for the current block.

Referring to FIG. 10, a prediction mode/partition size having a higher selection ratio (or frequency of occurrence) than direct mode may be present. Accordingly, when transmission overhead is considered, it can be advantageous to provide signaling information, so that whether other prediction mode (i.e., a prediction mode/partition size) having a higher selection ratio is applied or not can be determined first.

For example, assuming that a prediction mode/partition size having a higher frequency of occurrence than direct mode is mode A, information on whether mode A is applied or not can be transmitted prior to information on whether direct mode is applied or not.

To this end, in the example of FIG. 11, the encoder signals information on whether mode A is applied or not prior to information on whether direct mode is applied. In particular, the encoder first signals information skip_flag indicating whether skip mode is applied to the current block or not and then signals information modeA_flag indicating whether mode A is applied or not if skip mode is not applied.

If mode A is not applied, the encoder signals information pred_mode_partition_signaling indicating which one of the remaining prediction modes/partition sizes is applied to the current block along with direct mode.

Table 19 shows an example of a joint coding table in which a codeword is applied to information on a prediction type according to the example of FIG. 11. Table 19 illustrates an example in which inter prediction mode can be applied with one of the partitions {2N×2N, 2N×N, N×2N, N×N}, for convenience of description.

TABLE 19

| PREDICTION MODE | PARTITION | CODEWORD |
| --- | --- | --- |
| DIRECT |  | 1 |
| INTRA | 2N × 2N | 00000 |
|  | N × N | 00001 |
| INTER | N × N | 0001 |
|  | 2N × N | 01 |
|  | N × 2N | 001 |

In the example of Table 19, it is assumed that mode A is 2N×2N inter prediction mode, for convenience of description. Accordingly, 2N×2N inter preediction mode is first signaled without using the joint coding table, and whether direct mode is applied or not is signaled using the joint coding table together with other prediction types.

Meanwhile, unlike in the case where the transmission order is changed by taking the frequency of occurrence of a prediction type into consideration as in the example of FIG. 11, a codeword may be allocated to a prediction type by taking the frequency of occurrence of a prediction type into consideration.

Table 20 shows a joint coding table in which codewords are allocated by taking the frequency of occurrence of each prediction type into consideration. Table 20 illustrates an example in which inter prediction mode can be applied with one of the partitions {2N×2N, 2N×N, N×2N, N×N}, for convenience of description.

TABLE 20

| PREDICTION MODE | PARTITION | CODEWORD |
|---|---|---|
| INTRA | 2N × 2N | 00000 |
| | N × N | 00001 |
| INTER | N × N | 0001 |
| | 2N × 2N | 1 |
| | 2N × N | 001 |
| | N × 2N | 01 |

In the example of Table 20, it is assumed that N×2N inter prediction mode has a higher frequency of occurrence than 2N×N inter prediction mode, for convenience of description. In the case of Table 20, codewords allocated to 2N×N inter prediction mode and N×2N inter prediction mode are changed by taking the frequency of occurrence of a prediction type into consideration. In particular, assuming that 2N×N inter prediction mode has a lower frequency of occurrence than N×2N inter prediction mode, a shorter codeword 01 may be allocated to N×2N inter prediction mode, having a higher frequency of occurrence, and a longer codeword 001 may be allocated to 2N×N inter prediction mode, having a lower frequency of occurrence.

Here, the frequency of occurrence of a prediction type may be incorporated into both the signaling order and the allocation of the codewords.

Table 21 shows an example of a joint coding table in which signaling order is adjusted and codewords are allocated by taking the frequency of occurrence of a prediction type into consideration. Table 21 illustrates an example in which inter prediction mode can be applied with one of the partitions {2N×2N, 2N×N, N×2N, N×N}, for convenience of description.

TABLE 21

| PREDICTION MODE | PARTITION | CODEWORD |
|---|---|---|
| DIRECT | | 1 |
| INTRA | 2N × 2N | 00000 |
| | N × N | 00001 |
| INTER | N × N | 0001 |
| | 2N × N | 001 |
| | N × 2N | 01 |

In the example of Table 21, it is assumed that 2N×2N inter prediction mode has a higher frequency of occurrence than direct mode and N×2N inter prediction mode has a higher frequency of occurrence than 2N×N inter prediction mode, for convenience of description. Accordingly, whether 2N×2N inter prediction mode is applied or not may be transferred through separate signaling prior to whether direct mode is applied or not. Whether direct mode is applied or not may be signaled, together with other prediction types, using the joint coding table of Table 21. Here, a codeword 01 is allocated to N×2N inter prediction mode, having a higher frequency of occurrence than 2N×N inter prediction mode, the codeword 01 being smaller than a codeword 001 allocated to 2N×N inter prediction mode.

Meanwhile, even when merge mode is performed in a PU unit as described above, information on whether specific prediction mode, from among prediction modes in which motion information on a neighboring block is used as motion information on the current block, is applied or not may be first signaled separately and information on whether other prediction type is applied or not may be signaled through joint coding. For example, whether skip mode in {skip mode, direct mode, merge mode} or {(merge) skip mode, merge mode} is applied or not can be separately signaled in advance, and whether direct mode or merge mode is applied or not can be signaled through joint coding along with whether the remaining prediction types are applied.

Table 22 shows an example in which whether direct mode is appliedis signaled through joint coding together with whether other prediction types are applied, in a case where {skip mode, direct mode, merge mode} is used. In particular, whether any one of prediction types for direct mode and inter prediction mode/intra prediction mode is applied or not is not signaled through a flag, but the prediction types for direct mode and inter prediction mode/intra prediction mode are applied or not are separately signaled concurrently through a codeword allocated to a prediction type including direct mode. Table 22 illustrates an example in which inter prediction mode can be applied with one of the partitions {2N×2N, 2N×N, N×2N, N×N}, for convenience of description.

TABLE 22

| PREDICTION MODE | PARTITION | CODEWORD |
|---|---|---|
| DIRECT | | 1 |
| INTRA | 2N × 2N | 000000 |
| | N × N | 000001 |
| INTER | N × N | 00001 |
| | 2N × 2N | 01 |
| | 2N × N | 001 |
| | N × 2N | 0001 |

Referring to Table 22, the encoder can indicate a prediction type for the current block by sending a codeword corresponding to the prediction type applied to the current block.

Here, the encoder may allocate a codeword depending on the frequency of occurrence of each prediction type.

Table 23 shows an example of a joint coding table in which codewords are allocated by taking frequency of occurrence into consideration, assuming that 2N×2N inter prediction mode has a higher frequency of occurrence than direct mode.

TABLE 23

| PREDICTION MODE | PARTITION | CODEWORD |
|---|---|---|
| DIRECT | | 01 |
| INTRA | 2N × 2N | 000000 |
| | N × N | 000001 |
| INTER | N × N | 00001 |
| | 2N × 2N | 1 |
| | 2N × N | 001 |
| | N × 2N | 0001 |

Referring to Table 23, a codeword 1, being smaller than a codeword 01 allocated to direct mode, is allocated to 2N×2N inter prediction mode, which has a higher frequency of occurrence than direct mode.

Furthermore, Table 24 shows an example in which codewords are allocated by taking frequency of occurrence into consideration, assuming that 2N×N inter prediction mode has a lower frequency of occurrence than N×2N inter prediction mode.

TABLE 24

| PREDICTION MODE | PARTITION | CODEWORD |
|---|---|---|
| DIRECT | | 01 |
| INTRA | 2N × 2N | 000000 |
| | N × N | 000001 |
| INTER | N × N | 00001 |
| | 2N × 2N | 1 |
| | 2N × N | 0001 |
| | N × 2N | 001 |

Referring to Table 24, a codeword 1, being smaller than a codeword 01 allocated to direct mode, is allocated to 2N×2N inter prediction mode which has a higher frequency of occurrence, and a codeword 001 is allocated to N×2N inter prediction mode, being smaller than a codeword 0001 allocated to 2N×N inter prediction mode.

In the examples of FIG. 11 and Tables 19 to 24, since merge mode can be applied in a PU unit, signaling may be performed indicating that mode A is applied and then whether merge mode is applied to the current block or not may be signaled (merge_flag). Whether merge mode is applied to the current block or not may be signaled even when not direct mode, but inter prediction mode is indicated through Tables 19 to 24. Furthermore, when specific merge mode has a high selection ratio, mode A itself may be set as merge mode.

Figure 12:
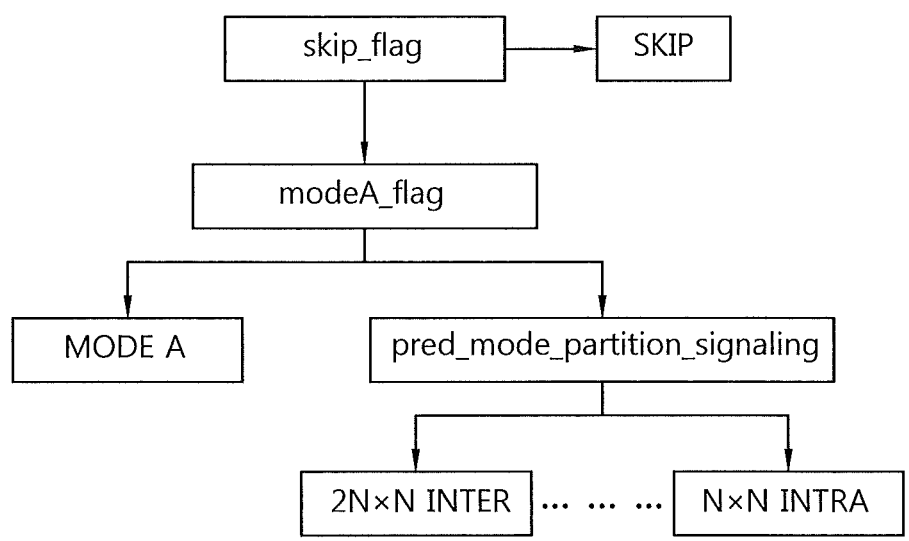
FIG. 12 is a diagram schematically illustrating another example of a method in which the encoder performs signaling in a system to which the present invention is applied.

FIG. 12 is a diagram schematically illustrating another example of a method in which the encoder performs signaling in a system to which the present invention is applied. FIG. 12 illustrates an example in which direct mode is not applied as prediction mode in which motion information of a neighboring block is used as motion information for the current block, that is, {(merge) skip mode, merge mode} is used and merge mode is applied in a PU unit.

When comparing the embodiment of FIG. 12 with the embodiment of FIG. 9 or 11, the number of pieces of information regarding whether prediction mode, in which motion information of a neighboring block is used as motion information for the current block is applied or not is reduced by one. If direct mode is excluded in the case of FIG. 9 or 10, overhead when information on inter/intra prediction modes is signaled can be subsequently reduced.

As in the case where {skip mode, direct mode, merge mode} is used, a prediction type can be signaled even when {(merge) skip mode, merge mode} is used. For example, in the example of FIG. 12, assuming that prediction mode or a prediction type having a high selection ratio (frequency of occurrence) is mode A from among the prediction types excluding (merge) skip mode, information on whether mode A is applied or not may be signaled (modeA_flag) prior to information on whether other prediction types, e.g. 2N×2N inter prediction mode, . . . , N×N intra prediction mode are applied. In addition, if mode A is not applied, whether other prediction types, e.g. 2N×2N inter prediction mode, . . . , N×N intra prediction mode, are applied may be signaled through joint coding.

Table 25 shows an example of a joint coding table in which codewords are allocated to information on a prediction type according to the example of FIG. 12. Table 25 illustrates an example in which inter prediction mode can be applied with one of the partitions {2N×2N, 2N×N, N×2N, N×N}, for convenience of description.

TABLE 25

| PREDICTION MODE | PARTITION | CODEWORD |
|---|---|---|
| INTRA | 2N × 2N | 0000 |
| | N × N | 0001 |
| INTER | N × N | 001 |
| | 2N × N | 1 |
| | N × 2N | 01 |

In the example of Table 25, it is assumed that a prediction type having the highest frequency of occurrence from among inter prediction modes having the partitions 2N×2N, 2N×N, N×2N, and N×N, that is, mode A, is 2N×2N inter prediction mode, for convenience of description. Accordingly, whether 2N×2N inter prediction mode is applied or not is signaled in advance through separate signaling.

In addition to the case where transmission order is determined by taking the frequency of occurrence of a prediction type into consideration as in the example of FIG. 12, the codewords can be allocated to the prediction types by taking the frequency of occurrence (or selection ratio) into consideration.

Table 26 shows an example of a joint coding table in which codewords are allocated by taking the frequency of occurrence of a prediction type into consideration, in a case where {(merge) skip mode, merge mode} is used. Table 26 illustrates an example in which inter prediction mode can be applied with one of the partitions {2N×2N, 2N×N, N×2N, N×N}, for convenience of description.

TABLE 26

| PREDICTION MODE | PARTITION | CODEWORD |
|---|---|---|
| INTRA | 2N × 2N | 00000 |
| | N × N | 00001 |
| INTER | N × N | 0001 |
| | 2N × 2N | 1 |
| | 2N × N | 001 |
| | N × 2N | 01 |

In the example of Table 26, it is assumed that N×2N inter prediction mode has a higher frequency of occurrence than 2N×N inter prediction mode. Accordingly, a codeword 01 shorter than a codeword 001 allocated to 2N×N inter prediction mode is allocated to N×2N inter prediction mode.

Furthermore, even when {(merge) skip mode, merge mode} is used, the frequency of occurrence of a prediction type can be incorporated into both signaling order and the allocation of codewords.

Table 27 shows an example of a joint coding table in which signaling order is adjusted and codewords are allocated by taking the frequency of occurrence of a prediction type into consideration, in a case where {(merge) skip mode, merge mode} is used. Table 27 illustrates an example in which inter prediction mode can be applied with one of the partitions {2N×2N, 2N×N, N×2N, N×N}, for convenience of description.

TABLE 27

| PREDICTION MODE | PARTITION | CODEWORD |
|---|---|---|
| INTRA | 2N × 2N | 0000 |
| | N × N | 0001 |
| INTER | N × N | 001 |
| | 2N × N | 01 |
| | N × 2N | 1 |

In the example of Table 27, it is assumed that 2N×2N inter prediction mode, from among 2N×2N, 2N×N, N×2N, and N×N inter prediction modes, has the highest frequency of occurrence and 2N×N inter prediction mode has a higher frequency of occurrence than N×2N inter prediction mode, for convenience of description. Accordingly, whether (merge) skip mode, whether merge mode is applied and whether 2N×2N inter prediction mode is applied can be transmitted through additional signaling. Whether other prediction types are applied is signaled using the joint coding table of Table 27. Here, a codeword 1 smaller than a codeword 01 allocated to 2N×N inter prediction mode is allocated to N×2N inter prediction mode having a higher frequency of occurrence than 2N×N inter prediction mode.

In the examples of FIG. 12 and Tables 25 to 27, whether merge mode is applied to the current block or not may be signaled (merge_flag) separately because merge mode can be applied in a PU unit. For example, after which inter prediction mode/partition is applied to the current block is signaled through Tables 25 to 27, whether merge mode is applied to the current block or not may be signaled. Furthermore, when specific merge mode has a high selection ratio, mode A itself may be set as merge mode.

Meanwhile, even when merge mode is applied in a PU unit, if {skip mode, direct mode, merge mode} is used, direct mode and merge mode can be integrated and used as integration mode as described above. Direct mode and merge mode are similar to each other in that motion information is derived from a neighboring block and, unlike skip mode, residual information is then transmitted. If integration mode is used, signaling overhead for information on whether inter/intra prediction modes except skip mode and integration mode are applied or not can be reduced. Even when integration mode is applied, signaling order and the allocation of codewords may be adjusted as described above.

Figure 13:
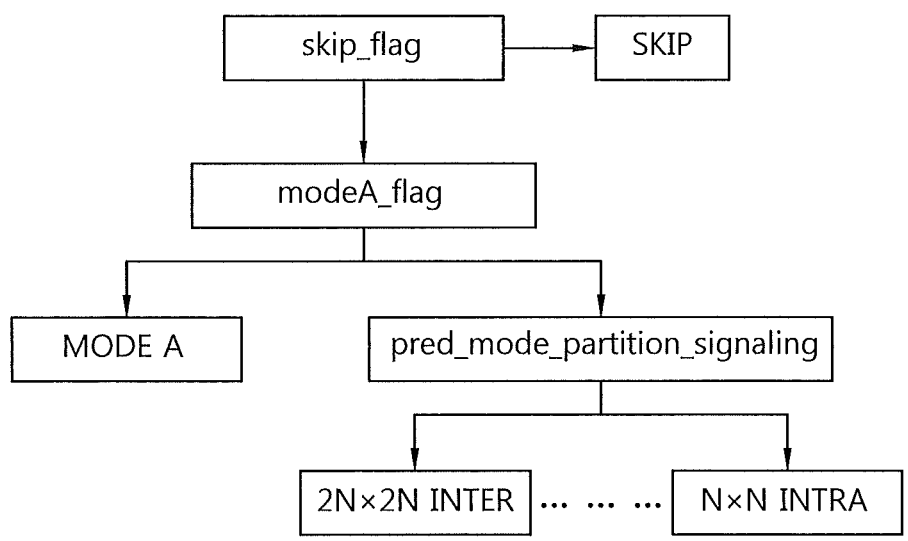
FIG. 13 is a diagram schematically illustrating yet another example of a method in which the encoder performs signaling in a system to which the present invention is applied.

FIG. 13 is a diagram schematically illustrating yet another example of a method in which the encoder performs signaling in a system to which the present invention is applied. FIG. 13 illustrates an example in which integration mode is used, but merge mode is applied in a PU unit.

In the example of FIG. 13, if skip mode is not applied after whether skip mode is applied or not is signaled, whether a prediction type having the highest frequency of occurrence, from among the remaining prediction types, is applied or not is signaled preferentially. That is, in FIG. 13, it is assumed that mode A is a prediction type having the highest frequency of occurrence, from among the remaining prediction types except skip mode. Here, mode A may be integration mode.

To this end, the encoder may signal whether mode A is applied or not when skip mode is not applied and may signal that which one of the remaining prediction types will be applied using joint coding (pred_mode_partition_signaling) when mode A is not applied.

Table 28 shows a joint coding table according to the example of FIG. 13.

TABLE 28

| PREDICTION MODE | PARTITION | CODEWORD |
|---|---|---|
| INTRA | 2N × 2N | 00000 |
| | N × N | 00001 |
| INTER | N × N | 0001 |
| | 2N × 2N | 1 |
| | 2N × N | 01 |
| | N × 2N | 001 |

In the examples of FIG. 7 and Table 11, a prediction type having the highest frequency of occurrence except skip mode is illustrated as being integration mode, but this is only an example for convenience of description. The present invention is not limited to the above example. For example, if 2N×2N inter prediction mode has a higher frequency of occurrence than integration mode, 2N×2N inter prediction mode may be determined as mode A, whether 2N×2N inter prediction mode is applied or not may be separately signaled in advance, and then whether integration mode is applied may be signaled using joint coding along with other prediction types.

Meanwhile, even when integration mode is used, codewords may be allocated by taking the frequency of occurrence (or selection ratio) of each prediction type into consideration in addition to the adjustment of signaling order.

Table 29 shows an example of a joint coding table in which codewords are allocated by taking the frequency of occurrence of a prediction type into consideration, in a case where integration mode is used. Table 29 illustrates an example in which inter prediction mode can be applied with one of the partitions {2N×2N, 2N×N, N×2N, N×N}, for convenience of description.

TABLE 29

| PREDICTION MODE | PARTITION | CODEWORD |
|---|---|---|
| INTRA | 2N × 2N | 00000 |
| | N × N | 00001 |
| INTER | N × N | 0001 |
| | 2N × 2N | 1 |
| | 2N × N | 001 |
| | N × 2N | 01 |

Table 29 illustrates an example in which N×2N inter prediction mode has a higher frequency of occurrence than 2N×N inter prediction mode. Accordingly, in the example of Table 29, a codeword 01 shorter than a codeword 001 allocated to 2N×N inter prediction mode is allocated to N×2N inter prediction mode.

Even when integration mode is applied, a codeword may be allocated to each of prediction types including integration mode, and a codeword corresponding to an applied prediction type may be signaled.

Table 30 schematically shows an example of a joint coding table that is used to send information on a prediction type (e.g., prediction mode and a partition size) applied to the current block by allocating a codeword to each of the prediction types other than skip mode, in a case where integration mode is used.

TABLE 30

| PREDICTION MODE | PARTITION | CODEWORD |
|---|---|---|
| MRG/DIRECT | | 1 |
| INTRA | 2N × 2N | 000000 |
| | N × N | 000001 |
| INTER | N × N | 00001 |
| | 2N × 2N | 01 |
| | 2N × N | 001 |
| | N × 2N | 0001 |

Table 30 illustrates an example in which inter prediction mode can be applied with one of the partitions {2N×2N, 2N×N, N×2N, N×N}, for convenience of description. Referring to Table 30, the encoder can allocate to a codeword each of prediction modes, that is, integration mode (merge/direct mode), 2N×2N and N×N intra prediction modes, and 2N×2N, 2N×N, N×2N, and N×N inter prediction modes and send the codeword of a prediction type applied to the current block.

Here, the encoder may allocate the codewords by taking the frequency of occurrence of each prediction type (selection ratio) into consideration. Table 31 shows an example in which codewords are allocated by taking the frequency of occurrence of each prediction type into consideration in the example of Table 30.

TABLE 31

| PREDICTION MODE | PARTITION | CODEWORD |
|---|---|---|
| MRG/DIRECT |  | 1 |
| INTRA | 2N × 2N | 000000 |
|  | N × N | 000001 |
| INTER | N × N | 00001 |
|  | 2N × 2N | 01 |
|  | 2N × N | 0001 |
|  | N × 2N | 001 |

In the example of Table 31, it is assumed that N×2N inter prediction mode has a higher frequency of occurrence than 2N×N inter prediction mode, for convenience of description. In the example of Table 31, as compared with the example of Table 30, a codeword 001 shorter than a codeword 0001 allocated to 2N×N inter prediction mode is allocated to N×2N inter prediction mode.

Meanwhile, in Tables 28 to 31, merge mode is applied in a PU unit. Accordingly, in the case the signaling order is adjusted (i.e. the case of Table 28, Table 31) or in the case integration mode including merge mode is taken into consideration equivalently with other prediction types (i.e. the case of Table 30), whether merge mode is applied or not does not need to be signaled separately if inter prediction mode/a partition size other than skip mode and integration mode is applied to the current block. In contrast, if information on a prediction type is signaled through Table 29, that is, the case where the codewords are allocated by taking frequency of occurrence into consideration without adjusting the signaling order, any one of inter-prediction mode and a partition size may be signaled to be applied to the current block and then information merge_flag on whether merge mode is applied to the current block or not may be signaled.

The cases where only the partitions {2N×2N, 2N×N, N×2N, N×N} are applied to inter prediction mode have been described so far, for convenience of description, but a prediction type for the current block may be signaled by taking all the partitions for inter mode into consideration.

Table 32 shows an example of a joint coding table that can be used to signal a prediction block for the current block, in a case where all the partitions 2N×2N, 2N×N, N×2N, N×N, 2N×nU, 2N×nD, nL×2N, and nR×2N are taken into account.

TABLE 32

| Pred_type | PredMode | PartMode |
|---|---|---|
| 0 | MODE_INTRA | PART_2N × 2N |
| 1 | MODE_INTRA | PART_N × N |
| 0 | MODE_INTER | PART_2N × 2N |
| 1 | MODE_INTER | PART_2N × N |
| 2 | MODE_INTER | PART_N × 2N |
| 3 | MODE_INTER | PART_N × N |
| 4 | MODE_INTER | PART_2N × Nu |
| 5 | MODE_INTER | PART_2N × nD |
| 6 | MODE_INTER | PART_nL × 2N |
| 7 | MODE_INTER | PART_nR × 2N |

TABLE 32-continued

| Pred_type | PredMode | PartMode |
|---|---|---|
| 8 | MODE_INTRA | PART_2N × 2N |
| 9 | MODE_INTRA | PART_N × N |

Referring to Table 32, each partition size of intra prediction mode and each partition size of inter prediction mode can be signaled using a prediction type. Accordingly, a prediction type for the current block may be signaled at once by jointly coding prediction mode and a partition size. Here, as described above, codewords may be allocated by taking frequency of occurrence into consideration for each prediction type.

In the example of Table 32, in the case of prediction mode in which motion information of a neighboring block is used as motion information for the current block without change, for example, in the case of {skip mode, direct mode, merge mode} or {(merge) skip mode, merge mode}, which mode is applied or not may be inferred based on other conditions or which mode is applied or not may have been sent in advance through separate signaling. In addition, it is assumed that merge mode is applied in a PU unit as in other examples in Table 32, and whether merge mode is applied or not can be signaled per partition.

Accordingly, whether merge mode is applied in a CU unit or not may be transferred through separate signaling as in the cases of Tables 17 and 32. If merge mode is not applied in a CU unit, whether merge mode is applied or not may be signaled (merge_flag) per each partition (i.e., PU) while signaling a prediction type for the current block as in Table 32 or after signaling a prediction type for the current block.

Prior to the signaling of each prediction type, pieces of additional information described above, for example, a slice type or information on partition may be signaled. In this case, the prediction types may be distinguished from one another based on the pieces of additional information. For example, in the case of an I slice, 2N×2N intra prediction mode may be indicated if the value of a prediction type is 0, and in the case of a B or P slice, 2N×2N inter prediction mode may be indicated if the value of a prediction type is 0.

Furthermore, the prediction types may be distinguished from one another by allocating different codewords to prediction types having different prediction modes/partitions.

Transmission efficiency can be improved by modifying a signaling scheme for prediction mode in an inter slice as described above. For example, prediction mode and a partition type for an inter slice may be jointly coded into a unary-type codeword. Here, as described above, information on prediction, such as prediction mode and a partition (size), can be called a prediction type. The prediction type may further include information on whether partition is performed or not and information on a slice type, etc., in addition to prediction mode and a partition (size).

Codewords indicative of prediction types can be rearranged depending on a portion of each prediction mode, that is, frequency of occurrence (or frequency of selection).

Prediction mode and a partition type (or a partition size) can be transmitted through a specific syntax element. For example, whether skip mode is applied or not can be signaled through the skip flag skip_flag as described above. Furthermore, whether merge mode is applied or not can be signaled through the merge flag merge_flag, whether direct mode is applied or not can be signaled through the direct mode flag direct_flag, and whether integration mode of direct mode and merge mode is applied or not can be signaled through the integration mode flag merge_direct_flag.

Meanwhile, if prediction modes signaled through specific flags are not applied to the current block, prediction mode and a partition size for the current block may be signaled separately.

Table 33 schematically shows an example in which prediction mode and a partition type (or partition size) are signaled in a CU level (or a CU parameter set).

TABLE 33

| coding_unit(x0,y0,log2CUSize) { | Descriptor |
|---|---|
| ... | |
| if(slice_type!=I) | u(1)\|ae(v) |
| pred_mode | |
| ... | |
| if(PredMode ==MODE_INTER) | |
| inter_partitioning_idc | ue(1)\|ae(v) |
| ... | |
| } | |

In the example of Table 33, the signaling may be performed in such a way as to jointly code prediction mode and partition information and send a corresponding codeword. Here, as in the example of Table 33, prediction mode and a partition type (or partition size) may be signaled using separate syntax elements. In Table 33, prediction mode may be indicated by pred_mode and the partition size of inter prediction mode may be indicated by inter_partitioning_idc.

Meanwhile, as described above, the signaled syntax element can be named as pred_mode_partition_signaling since the syntax element includes information on prediction mode and partition, and the signaled syntax element can be also simply named as pred_type as the information including information on prediction mode and partition mode, etc., is named as prediction type. In case of pred_mode_partition_signaling or pred_type, pieces of related information (e.g., prediction mode and a partition size) may be specified in the form of one codeword through joint coding and signaled.

Table 34 schematically shows an example of codewords described above.

TABLE 34

| PREDICTION MODE | PARTITION | | CODEWORD |
|---|---|---|---|
| DIRECT | | 0 | — |
| INTRA | 2N × 2N | 1 | 00000 |
| | N × N | 1 | 00001 |
| INTER | N × N | 1 | 0001 |
| | 2N × 2N | 1 | 1 |
| | 2N × N | 1 | 01 |
| | N × 2N | 1 | 001 |

If the signaling order shown in FIG. 3 is used as a signaling method for each prediction mode, whether skip mode is applied or not, whether merge mode is applied or not, and whether direct mode applied or not can be sequentially signaled as described above. If skip mode, merge mode, and direct mode are not applied, which one of the remaining prediction types is applied is signaled using joint coding. This has already been described with reference to FIG. 3.

Meanwhile, when taking Table 34 into account, a codeword for each prediction mode has a different length. In accordance with a source coding theory, the length of each codeword is approximately proportional to the absolute value of the log value of an occurrence probability. Accordingly, in order to improve coding efficiency, it is better to use the shortest codeword for the most frequent symbol.

To this end, the codewords of Table 34 can be rearranged without increasing the complexity of encoding/decoding by taking frequency of occurrence into consideration for each prediction type in order to improve coding efficiency.

As an example in which an occurrence probability for each prediction type (or prediction mode) was measured, the example of FIG. 4 was described above. In the example of FIG. 4, as described above, 2N×2N inter prediction mode has a larger portion than direct mode and N×2N inter prediction mode has a larger portion than 2N×N inter prediction mode for the number of times of occurrence in all the prediction types. Accordingly, the codewords for 2N×2N inter prediction mode and direct mode may be switched and the codewords for N×2N inter prediction mode and 2N×N inter prediction mode may be switched depending on frequency of occurrence, that is, their portion in the number of times of occurrence in all the prediction types.

Table 35 shows an example in which codewords for each prediction types have been rearranged as described above in Table 34.

TABLE 35

| PREDICTION MODE | PARTITION | | CODEWORD |
|---|---|---|---|
| DIRECT | | 1 | — |
| INTRA | 2N × 2N | 1 | 00000 |
| | N × N | 1 | 00001 |
| INTER | N × N | 1 | 0001 |
| | 2N × 2N | 0 | — |
| | 2N × N | 1 | 001 |
| | N × 2N | 1 | 01 |

In Tables 34 and 35, a prediction type to be signaled separately is first detected by allocating a codeword 0 to the prediction type. Next, what prediction type is applied is indicated at once by allocating codewords to the remaining prediction types. This is similar to the features described with reference to FIGS. 5 to 8.

The example of FIG. 3 corresponds to an example in which merge mode is applied in a CU unit as described above. The examples in which merge mode is applied in a PU unit include the example of FIG. 9. In the example of FIG. 9, whether merge mode is applied or not may be signaled for each partition of inter prediction mode as described above.

FIG. 10 shows the portion (i.e., frequency of occurrence) of each prediction type when merge mode is applied in a PU unit. Even when merge mode is applied in a PU unit as described above, signaling order may be adjusted or codewords may be allocated for each prediction type by taking frequency of occurrence into consideration. This has already been described with reference to FIGS. 11 to 13.

Figure 14:
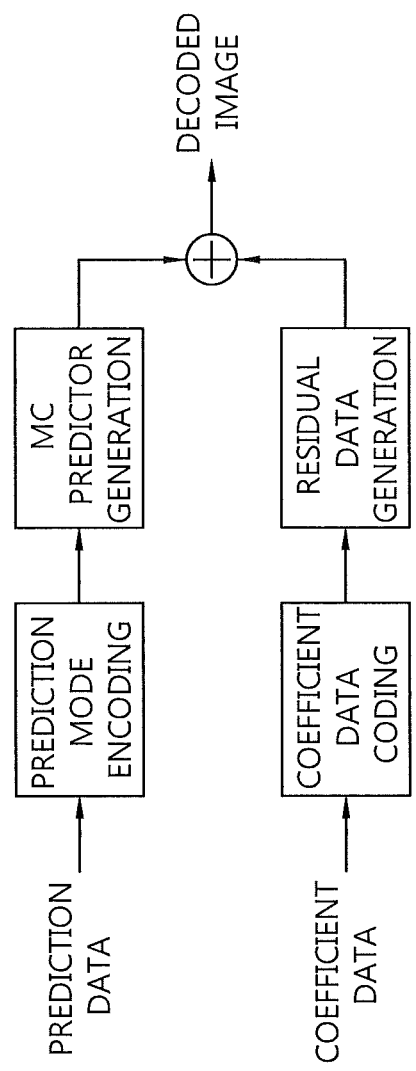
FIG. 14 schematically shows an example of a decoding process.

Meanwhile, FIG. 14 schematically shows an example of a decoding process. Referring to FIG. 14, prediction data may experience a prediction mode decoding process and a process of generating a motion compensation (MC) predictor. Coefficient data may experience a process of decoding the coefficient data and a process of generating residual data. Next, a decoded image may be finally generated.

Figure 15:
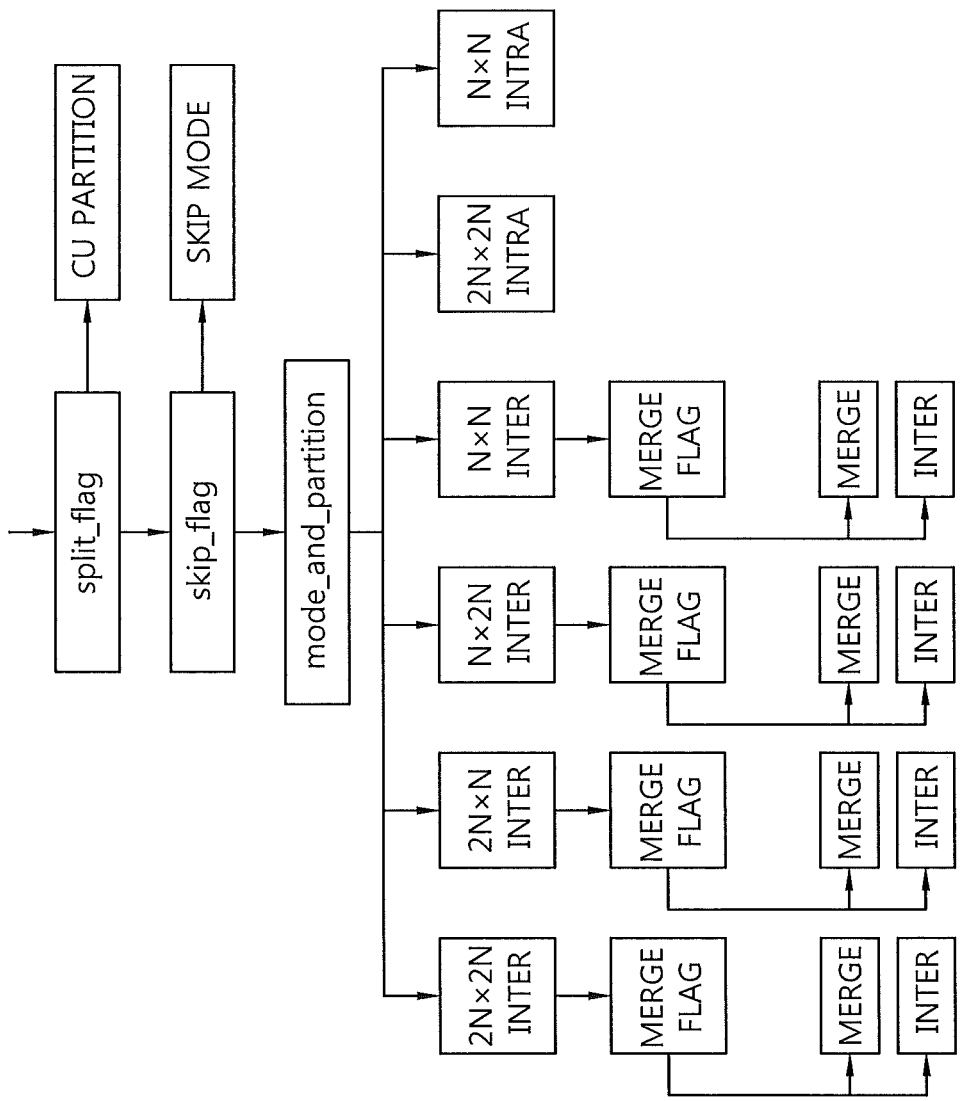
FIG. 15 is a diagram illustrating a prediction mode decoding process in a decoding process.

FIG. 15 is a diagram illustrating the prediction mode decoding process showed in FIG. 14. FIG. 15 illustrates an example in which {(merge) skip mode, merge mode} is used as prediction mode in which motion information of a neighboring block is used as motion information for the current block.

For the inter slice, information to be signaled in relation to prediction may include information on partition, information on whether skip mode is applied or not, information on whether merge mode is applied or not, and information on which one of the prediction types of inter prediction mode and intra prediction mode is applied, etc. The information on which one of the prediction types of inter prediction mode and intra prediction mode is applied can be classified into four types 2N×2N, N×N, 2N×N, and N×2N depending on a partition size in the case of inter prediction mode and can be classified into two types 2N×2N and N×N depending on a partition size in the case of intra prediction mode. In the case of inter prediction mode, the information on which one of the prediction types of inter prediction mode and intra prediction mode is applied can be further classified because the partition sizes 2N×nU, 2N×nD, nL×2N, and nR×2N may be used additionally as described above.

In the prediction mode decoding process, the decoder splits a CU according to a split flag partition_flag and then applies skip mode according to the skip flag. If skip mode is not applied, the decoder determines a prediction type to be applied to the current block based on information which indicates the prediction type (e.g., mode_and_partition). Here, if inter prediction mode is applied, the decoder may determine whether to apply merge mode or not in a PU unit through the merge flag. Furthermore, the partition size N×N may be used only when the size of the current CU is a minimum irrespective of whether the partition size N×N is inter prediction mode or intra prediction mode.

Here, in order to improve compression efficiency, all prediction types including prediction mode and partition information may be signaled using joint coding.

Figure 16:
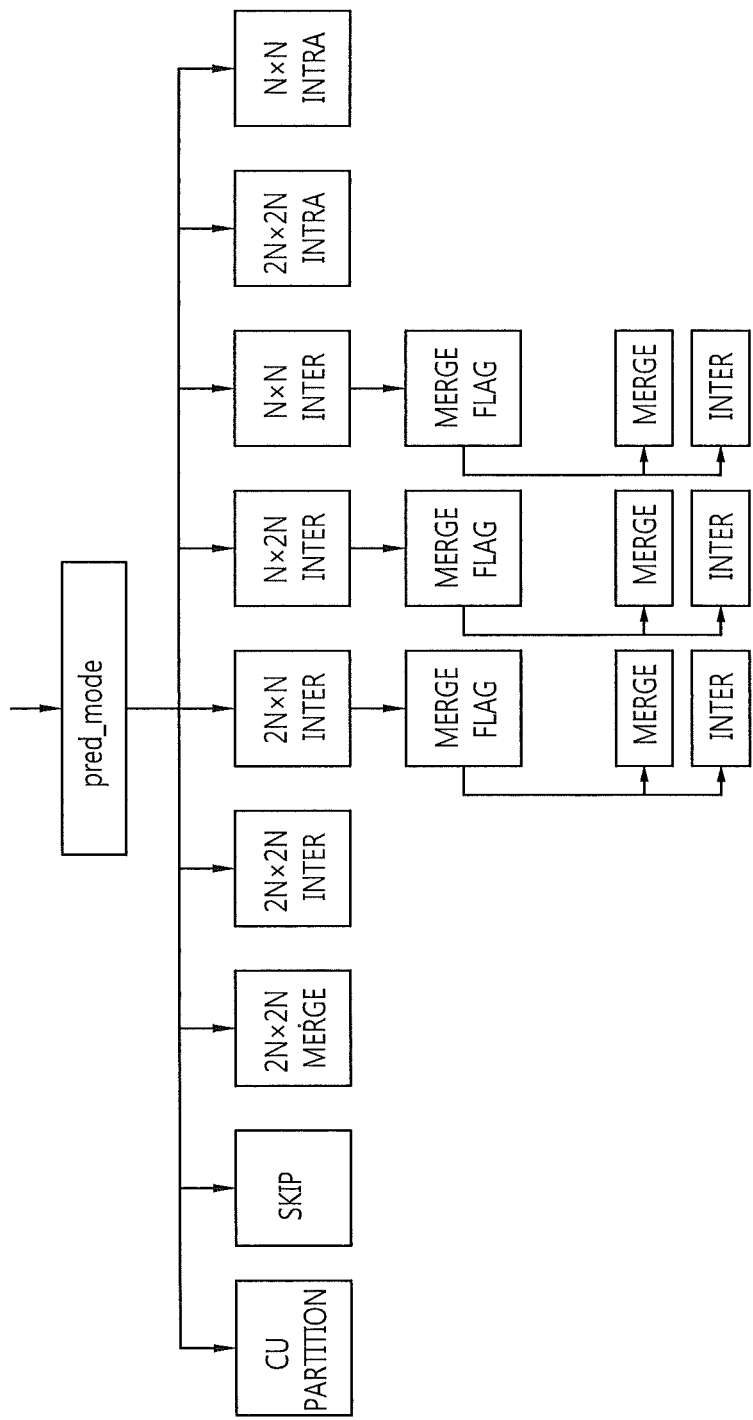
FIG. 16 is a diagram schematically illustrating an example of a method of signaling prediction mode and partition information through joint coding.

FIG. 16 is a diagram schematically illustrating an example of a method of signaling prediction mode and partition information through joint coding. Referring to FIG. 16, Table 36 shows an example of a joint coding table according to the example of FIG. 16 and shows initial codewords allocated when joint coding is performed.

TABLE 36

| PREDICTION MODE | | INITIAL CODEWORD | |
|---|---|---|---|
| | | CU SIZE > MIN | CU SIZE = MIN |
| SPLIT | | 1 | — |
| SKIP | | 01 | 1 |
| MERGE | 2N × 2N | 001 | 01 |
| INTER | 2N × 2N | 0001 | 001 |
| | 2N × N | 00001 | 0001 |
| | N × 2N | 000001 | 00001 |
| | N × N | — | 0000000 |
| INTRA | 2N × 2N | 000000 | 000001 |
| | N × N | — | 0000001 |

Using the table 35 as initial state, the mode selected to ne applied to the current block is switched (or adapted) with the mode right above the selected mode per each signaling. Accordingly, if a selection ratio for specific mode (i.e., a prediction type) is increased, a shorter codeword can be allocated to the specific mode for which the selection ratio has been increased. When a short codeword is allocated to a frequently selected mode, compression efficiency can be improved.

This adaptation can be performed independently in the depth of each block. In other words, the adaptation can be performed independently with specific adaptation depending on the size of a CU.

Here, a compression effect can be further increased by changing a joint coding range. In the above description, the object of joint coding may include whether partition will be performed, whether skip mode is applied or not, whether 2N×2N merge mode is applied or not, whether 2N×2N inter prediction mode is applied or not, whether 2N×N inter prediction mode is applied or not, whether N×2N inter prediction mode is applied or not, whether N×N inter prediction mode is applied or not, whether 2N×2N intra prediction mode is applied or not, and whether N×N intra prediction mode is applied or not. In addition, the object of joint coding may further include whether 2N×N merge mode is applied or not, whether N×2N merge mode is applied or not, and whether N×N merge mode is applied or not.

In the signaling method of FIG. 16, compression efficiency is improved through codeword adaptation (or switching) after joint coding. However, a greater amount of information may have to be transmitted because a codeword is switched in the adaptation process as for an element that is signaled with fixed small amount of information when joint coding is not performed. For example, the information partition_flag on whether partition will be performed or not can be processed using the amount of information of 1 bit because signaling of partition_flag is performed at the front when joint coding is not performed. Even when joint coding is performed, the smallest amount of information (i.e., the shortest codeword) can be used as an initial value as in Table 36. If a lot of skip mode or 2N×2N merge mode is consecutively selected in the coding process, the position of information on whether partitioning will be performed or not (hereinafter referred to as information indicative of partition mode, for convenience of description) is pushed back and thus placed at a position to which a longer codeword is allocated. As a result, bits can be wasted when partition mode is selected later in the process.

Figure 17:
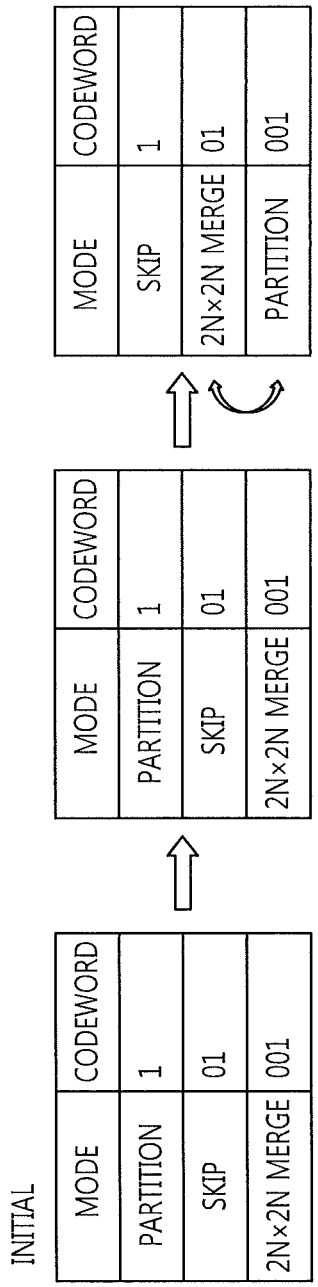
FIG. 17 is a diagram schematically illustrating an example of a case where bits are wasted due to a codeword allocated to partition mode being lengthened.

FIG. 17 is a diagram schematically illustrating an example of a case where bits are wasted because a codeword allocated to partition mode is lengthened. Referring to FIG. 17a codeword 1 is allocated to in partition mode, at the early stage. When skip mode is selected, however, the positions of skip mode and the positions of partition mode are switched. When 2N×2N merge mode is selected, the positions of partition mode and the positions of 2N×2N merge mode are switched. Here, when partition mode is selected regarding the current block, the partition flag partition_flag indicating whether partition mode is applied or not is signaled with a size of 3 bits because a codeword allocated to the position of partition mode is '001'.

To this end, a method of improving compression efficiency by modifying a range of mode in which joint coding is applied can be taken into consideration.

Change of a Joint Coding Range

The following methods can be taken into consideration as various methods of changing a joint coding range.

(1) Whether partition will be performed or not is signaled using a flag, and joint coding can be applied to the remaining modes as described above.

(2) Whether partition will be performed or not is signaled using a flag, and joint coding can be applied to the remaining modes by adding information or mode to the remaining modes.

(3) Joint coding is applied to partition mode and skip mode, and separate joint coding can be applied to the remaining modes.

(4) Joint coding is applied to partition mode, skip mode, and merge mode, and separate joint coding can be applied to the remaining modes. Here, merge mode that is jointly coded may be the merge flag merge_flag or may be specific mode, such as 2N×2N merge mode. In addition, if the merge flag is the object of joint coding, when inter prediction mode is selected later, the merge flag can be used to determine whether merge mode is applied or not and when intra prediction mode is selected later, a most probable mode (MPM) flag mpm_flag can be derived or inferred from the merge flag and used to determine whether the mpm value is applied or not.

Meanwhile, a change of the joint coding range may be applied adaptively. For example, the methods of applying joint coding by changing a target range can be adaptively applied to units, such as depth/block/slice/frame/group of picture (GOP). The following methods can be taken into consideration as examples of a method of adaptively applying a change of joint coding range.

(1) Additional information can be signaled to each application unit of joint coding.

(2) Whether a change of joint coding range will be applied or not can be determined based on neighbor's information.

(3) Whether a change of joint coding range will be applied or not can be determined based on statisticall values. For example, information on a previous slice/frame can be applied to the current slice/frame. In another example, accumulative statistical information on a plurality of previous slices/frames can be applied to the current slice/frame, or accumulative statistical information on some of or all of the blocks decoded before the current block in the same slice/frame can be applied to the current slice/frame.

(4) Different joint coding ranges can be applied to a case where a CU size is a minimum and a case where a CU size is not a minimum.

In addition, a codeword may be changed per each joint coding. For example, codewords for the subjects of joint coding can be adaptively applied to units, such as depth/block/slice/frame/GOP. Furthermore, for an adaptive application, a method of signaling additional information per each application unit, a method of determining whether a change of joint coding range will be applied or not based on neighbor's information, or a method of determining whether a change of joint coding range will be applied or not based on statistical values may be used.

A method of applying information on a previous slice/frame to the current slice/frame, a method of applying accumulative statistical information on a plurality of previous slices/frames to the current slice/frame, or a method of applying accumulative statistical information on some of or all blocks, decoded before the current block in the same slice/frame, to the current slice/frame can be used as the method of determining whether a change of joint coding range will be applied or not based on statistical values as described above.

Furthermore, even when a codeword is changed for each joint coding, adaptation can be differently applied to a case where a CU size is a minimum and a case where a CU size is not a minimum.

Reset of Adaptation for the Object of Joint Coding

As an alternative to the method of changing a joint coding range, the method can be considered that joint coding and adaptation for the object is performed and then the adaptation is stopped per a specific unit and then initialization (reset) is performed.

Here, any one of the elements of joint coding may be the object of a reset, all the elements of joint coding may be the object of a reset, or only some of a plurality of elements of joint coding may be the object of a reset.

Furthermore, a reset unit may be a CU or the Largest Coding Unit (LCU). Furthermore, a slice, a frame, or a GOP may be used as a reset unit.

As an example of adaptation reset, a case where the elements of joint coding which are the object of reset, are partition modes and a reset unit is the LCU can be considered.

The LCU is CU of a maximum size from among CUs, and the depth of the LCU may be set to 0. Whenever the LCU is divided into four equal parts, the depth is increased. The LCU can be divided to a specific depth in such a manner that the LCU is recursively divided into several sub-CUs within the LCU, that is, an individual sub-CU is again divided into several sub-CUs.

Figure 18:
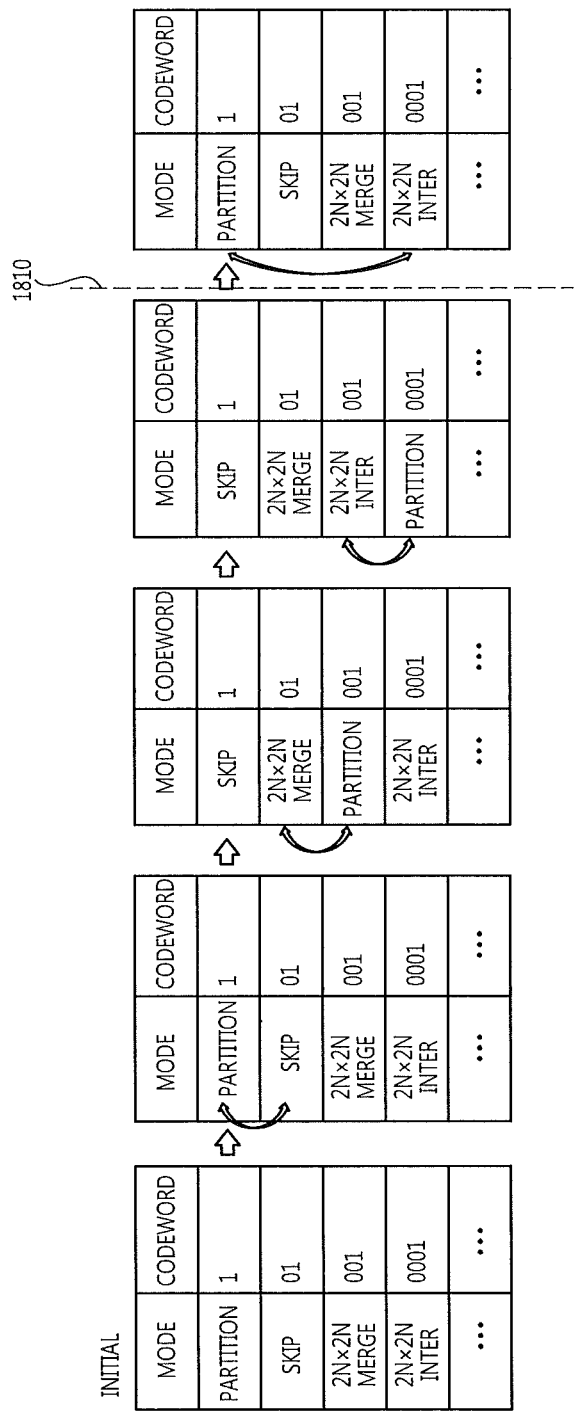
FIG. 18 is a diagram schematically illustrating an example of adaptation reset in which partition mode is the object of the reset and the largest coding unit (LCU) is a reset unit in a system to which the present invention is applied.

FIG. 18 is a diagram schematically illustrating an example of adaptation reset in which partition mode is the object of reset and the LCU is a reset unit in a system to which the present invention is applied. Referring to FIG. 18, adaptation continues to be performed in an early state. For example, when skip mode is selected regarding a first target block, partition mode and skip mode can be switched. Next, when 2N×2N merge mode is selected regarding a next target block, partition mode and 2N×2N merge mode can be switched. Next, when 2N×2N inter prediction mode is selected regarding a next target block, partition mode and 2N×2N inter prediction mode can be switched. While moving along a block in which prediction mode is selected such a way above, partition mode is reset when passed through the boundary of the LCU. Accordingly, the position of partition mode moves to a position corresponding to a codeword '1', that is, the first position, and the position of each of the remaining modes is adjusted downward one rank.

Change of an Adaptation Method

A codeword is currently adapted every signaling for prediction mode according to raster scan order. This method can be modified in order to improve a compression effect.

FIG. 19 is a diagram schematically illustrating a codeword adaptation method. FIG. 19(*a*) schematically shows a method of adapting a codeword according to raster scan order as in the existing adaptation method. In the example of FIG. 19(*a*), adaptation results are accumulated, thus influencing the coding of a next block.

The coding performance of the current block can be further improved by referring to a tendency of a neighboring block rather than to a tendency corresponding to adaptation results that are accumulated according to circumstances. For a system to which the present invention is applied, in coding of block D as in FIG. 19(*b*) as in FIG. 19(*b*), reference can be made to a tendency of a block A or a block C, that is, tendency of a neighboring block, rather than to a tendency of adaptation results that are accumulated up to the block C. This is because there is a high probability that the characteristics of the block D will be similar with those of the block A or the block C, that is, a neighboring block.

Accordingly, the existing adaptation method can be changed as follows.

(1) Adaptation results are accumulated, but whether adaptation will be performed or not and an adaptation method can be determined with reference to a neighboring block.

(2) Adaptation results are not accumulated, and whether adaptation will be performed or not and an adaptation method can be determined with reference to a neighboring block.

(3) Adaptation can be performed with different criteria depending on mode. For example, regarding partition mode, adaptation can be performed while accumulating adaptation results. Regarding other modes, adaptation can be performed with reference to a neighboring block.

(4) Adaptation can be performed according to the same criterion for the size of a neighboring block and a current block and the type of mode. Here, the degree of adaptation may be changed depending on the number of neighboring blocks having the same type of mode.

Figure 20:
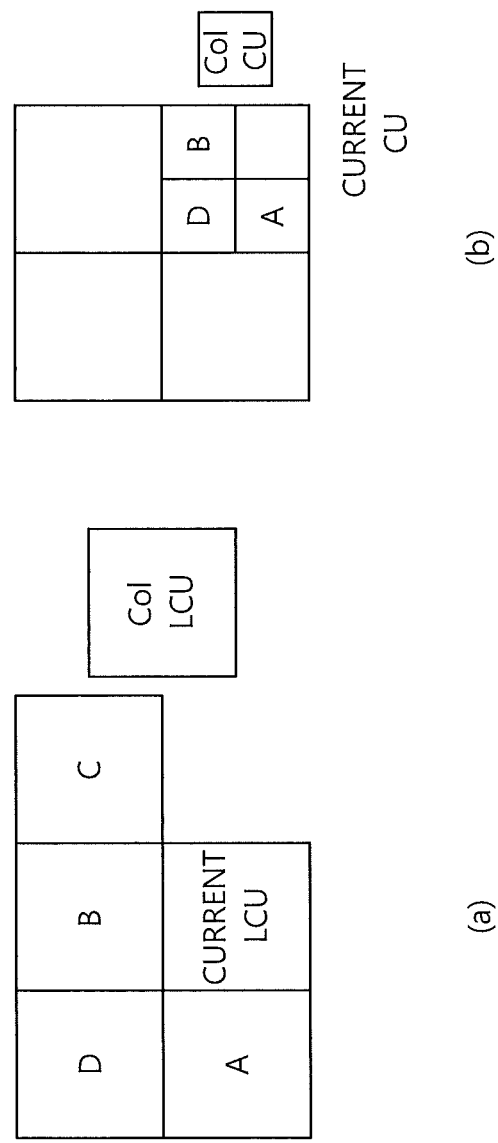
FIG. 20 is a diagram schematically illustrating an example of neighbor reference blocks for adaptation in a system to which the present invention is applied.

FIG. 20 is a diagram schematically illustrating an example of neighboring reference blocks for adaptation in a system to which the present invention is applied. Neighboring blocks to which reference is made for adaptation can be set as in the example of FIG. 20.

For example, reference can be selectively made to neighboring blocks in an LCU unit as in FIG. 7(a). For another example, reference can be selectively made to neighboring blocks in a CU unit as in FIG. 7(b). Here, the neighboring blocks can include not only spatial neighboring blocks A, B, C, and D, but also temporal neighboring blocks Col LCU and Col CU.

For another example, reference can be made to neighboring partitions in a partition unit that is further split in a CU.

The LCU or CU may include different types of partitions. Accordingly, when reference is made to a neighboring block, reference can be made only to a neighboring block having the same type of CU size or partition, or alternatively reference can be made irrespective of whether a neighboring block has the same type of a CU size or partition.

Furthermore, when reference is made to a neighboring block, the order of priority or a ranking weight may be assigned to a neighboring block depending on the position of the reference block. For example, in FIG. 20, regarding the current LCU or the current CU, reference may be made to neighboring blocks in such a manner that reference is first made to a block A and reference is made to a block B if the block A is not available.

Figure 21:
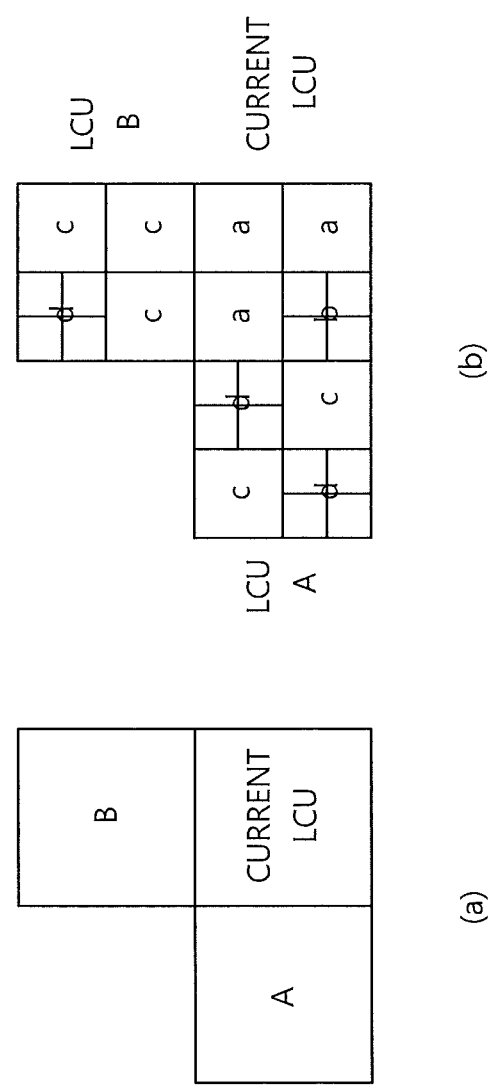
FIG. 21 is a diagram schematically illustrating an embodiment of a method of changing adaptation in a system in which the present invention is applied.

FIG. 21 is a diagram schematically illustrating an embodiment of a method of changing adaptation in a system to which the present invention is applied.

FIG. 21(a) schematically shows an embodiment in which adaptation is applied in an LCU unit. Accordingly, in the example of FIG. 21(a), an initial codeword may be adapted to each of prediction partitions that belong to LCUs A and B. Here, an adapted codeword mapping table (or a joint coding table) may be used to code each prediction partition that belongs to the current LCU.

FIG. 21(b) also schematically shows an embodiment in which adaptation is applied in an LCU unit. In the example of FIG. 21(b), an initial codeword is adapted to each of prediction partitions that belong to LCUs A and B, but the adaptation is independently performed according to a CU size. Accordingly, a plurality of codeword mapping tables is used depending on a CU size.

In the example of FIG. 21(b), an adapted codeword is used to code each prediction partition that belongs to the current LCU, but a plurality of independently generated codeword mapping tables is used depending on a specific CU size on which adaptation will be performed. Accordingly, when a CU belonging to the current LCU is coded using a codeword mapping table, a codeword mapping table determined for each CU size can be used. For example, in the example of FIG. 21(b), a codeword mapping table which is adapted to regions 'c' is used for regions 'a' having identical size with region 'c', and a codeword mapping table which is adapted to regions 'd' is used for regions 'b' having identical size with region 'b'.

Meanwhile, although the signaling methods have been described so far on the basis of inter prediction mode, signaling can also be performed on intra prediction mode if prediction is performed as can be seen from the above-described joint coding tables.

Figure 22:
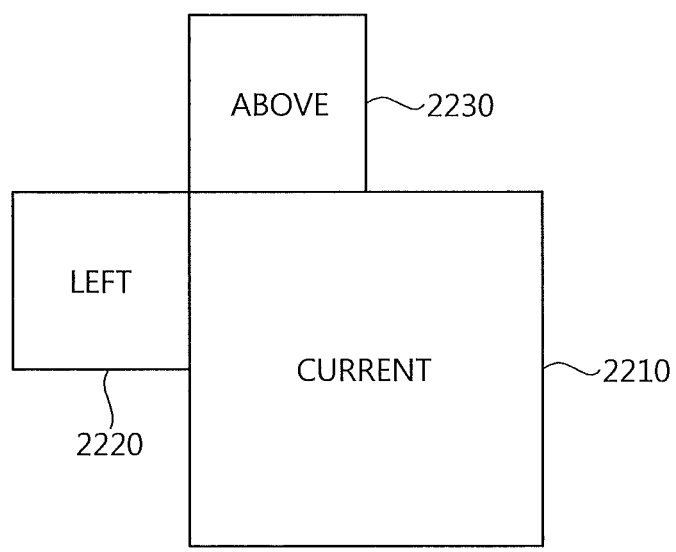
FIG. 22 is a diagram schematically illustrating an example of an intra-prediction method for the current block.

FIG. 22 is a diagram schematically illustrating an example of an intra prediction method for the current block. Referring to FIG. 22, as to intra prediction for the current block 2210, intra prediction mode of a left block 2220 and an above block 2230 can be checked. Here, the most probable mode (MPM) of the current block 2210 may be determined as smaller mode from among mode for the left block 2220 and mode for the right block 2230 (MPM=min (an upper intra prediction mode, a left intra prediction mode)).

Next, the encoder may signal a flag indicating whether intra prediction mode for the current block 2210 is the MPM. If the flag is set, intra prediction mode for the current block becomes the MPM. If intra prediction mode for the current block 2210 is not the MPM, the encoder signals information on mode B indicating intra prediction mode for the current block 2210.

If mode B<MPM, mode B is used as intra prediction mode for the current block 2210 without change. If mode B≥MPM, mode B+1 is used as intra prediction mode for the current block 2210. This is because a case where intra prediction mode for the current block 2210 is the MPM does not need to be taken into consideration because the case has already been signaled.

If an invalid candidate is included among MPM candidates, the MPM can be inferred as DC prediction mode in a corresponding case. In this case, a method of determining the MPM without simply inferring the MPM as DC prediction mode can be taken into consideration in order to improve compression efficiency.

Determining the MPM for a Case where Some of MPM Candidates are Valid

In a existing skills, if an invalid candidate is included in MPM candidates (e.g., the above block and the left block, etc.), the MPM is determined as DC prediction mode as described above. If some of MPM candidates are valid, however, intra prediction mode for the valid candidates can be used as the MPM of the current block according to circumstances.

Figure 23:
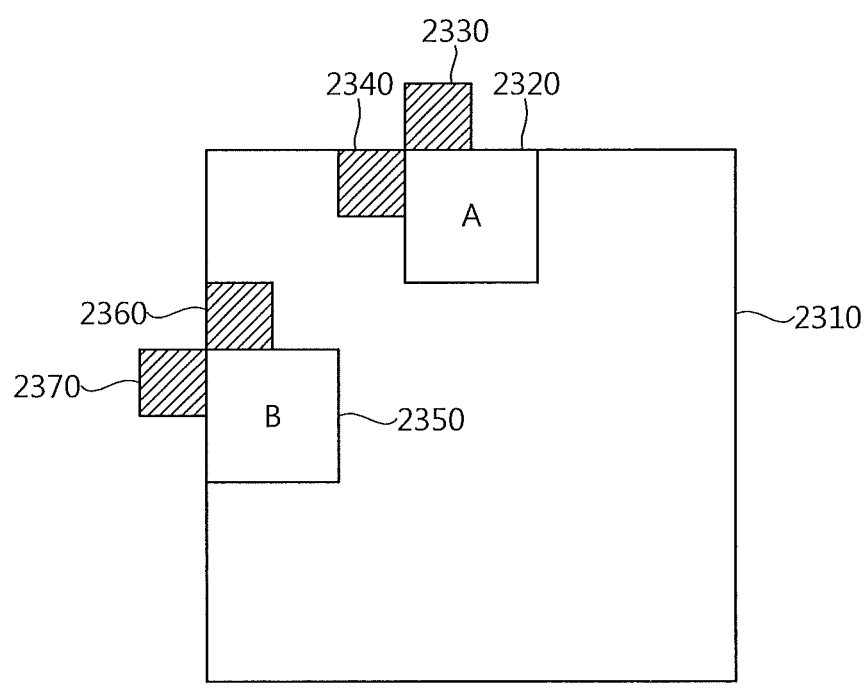
FIG. 23 is a diagram schematically illustrating an example of a method for determining a most probable mode (MPM) when some of MPM candidates are valid in a system to which the present invention is applied.

FIG. 23 is a diagram schematically illustrating an example of a method of determining the MPM when some of MPM candidates are valid in a system to which the present invention is applied. In the example of FIG. 23, a case where the current block is placed at the boundary of a frame 2310 is described.

In the example of FIG. 23, assuming that the current block is A 2320, the above block 2330 of the current block 2320 is not valid, but the left block 2340 of the current block 2320 is valid. Accordingly, the MPM of the current block 2320 may be set as mode for the left block 2340.

In addition, assuming that the current block is B 2350, the left block 2370 of the current block 2350 is not valid, but the above block 2360 of the current block 2350 is valid. Accordingly, the MPM of the current block 2350 can be set as mode for the above block 2360.

Change of a Method of Determining the MPM

In the existing skills, MPM=min(intra prediction mode for the left block, intra prediction mode for the above block) as described above. A method of setting minimum mode, from among candidates, as the MPM has an effect in terms of signaling overhead, but it is difficult to precisely incorporate intra prediction mode for the current block into the method.

In order to solve this problem, a method of setting the MPM of the current block as the mean of intra prediction mode for the above block and intra prediction mode for the left block can be taken into consideration. Since the MPM has to be derived as an integer value and the derived MPM has to correspond to intra prediction mode, rounding can be applied if the mean of intra prediction mode for the above block and intra prediction mode for the left block is not an integer in order to round off or omit a value below the decimal point.

For example, assuming that intra prediction mode for the above block is 4 and intra prediction mode for the left block is 8, the MPM of the current block is (4+8)/2, that is, mode 6.

Furthermore, assuming that intra prediction mode for the above block is 3 and intra prediction mode for the left block is 6, the MPM of the current block is (3+6)/2, that is, 4.5. The MPM of the current block may be mode 5 by taking rounding-up and the MPM of the current block may be mode 4 by taking rounding-off.

The change of the method of determining the MPM can also be adaptively applied to each block, slice, or frame.

Extension of an MPM Candidate

As described above, intra-prediction mode for the above block and intra-prediction mode for the left block are used as MPM candidates in the existing skills. Prediction accuracy can be increased by further extending the MPM candidates.

FIG. 24 is a diagram schematically illustrating the extension of an MPM candidate in a system to which the present invention is applied. Referring to FIG. 24, an MPM candidate for a current block 2400 may be extended to intra prediction mode for a left-above block, intra prediction mode for a right-above block, intra prediction mode for a left-below block, intra prediction mode for an above block, intra prediction mode for a left block, and intra prediction mode for a temporal neighboring block (col block).

The temporal neighboring block may indicate a block placed at the same position as the current block in a frame or slice that has been coded temporally prior to the current frame or slice.

This extension of the MPM candidate block can be adaptively applied to each block, slice, or frame.

Extension of an MPM Candidate and Change of a Method of Determining the MPM

When the MPM candidate is extended as described above, a method of determining the MPM may be extended to determine the MPM in various manners. For example, the use of at least one of the following methods can be taken into consideration as a method of determining the MPM.

(1) MPM=mim (MPM candidates). In accordance with this method, minimum mode from among MPM candidates can be selected as the MPM of the current block.

(2) MPM=average (MPM candidates). In accordance with this method, the mean of MPM candidates can be selected as the MPM of the current block. In this case, if the mean of the MPM candidates is not an integer, rounding can be applied as described above.

(3) MPM=median (MPM candidates). In accordance with this method, the median of MPM candidates can be selected as the MPM of the current block.

(4) MPM=most frequent value (MPM candidates). In accordance with this method, an MPM candidate that is most frequently selected or generated, from among MPM candidates, can be selected as the MPM of the current block.

The change of the method of determining the MPM based on the extended MPM candidates can be adaptively applied to each block, slice, or frame.

Figure 25:
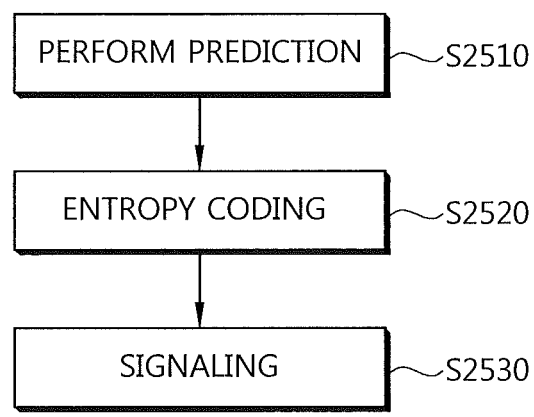
FIG. 25 is a flowchart schematically illustrating an operation of the encoder in a system to which the present invention is applied.

FIG. 25 is a flowchart schematically illustrating an operation of the encoder in a system to which the present invention is applied.

Referring to FIG. 25, the encoder performs prediction on the current block in step S2510. The encoder can apply intra prediction or inter prediction to the current block. The prediction can be performed by taking the partition size, and slice type of the current block, etc. into consideration.

The encoder performs entropy coding on the prediction results of the current block in step S2520. A method, such as CABAC or CAVLC, can be used in the entropy coding as described above, and a codeword may be allocated by taking the frequency of occurrence of each prediction mode or prediction type, etc. into consideration.

The encoder signals the entropy coded information in step S2530. A method of signaling whether specific prediction mode/prediction type is applied or not may be utilized by way of additional information, for example, a flag can be used as a method of signaling the information on prediction mode. A method of concurrently jointly coding elements included in a prediction type and signaling which one of prediction modes is applied, can be used also as a method of signaling the information on prediction mode.

Detailed contents of the method of allocating a codeword by taking the frequency of occurrence of a prediction type/prediction mode into consideration and the method of signaling information on prediction have been described above.

Figure 26:
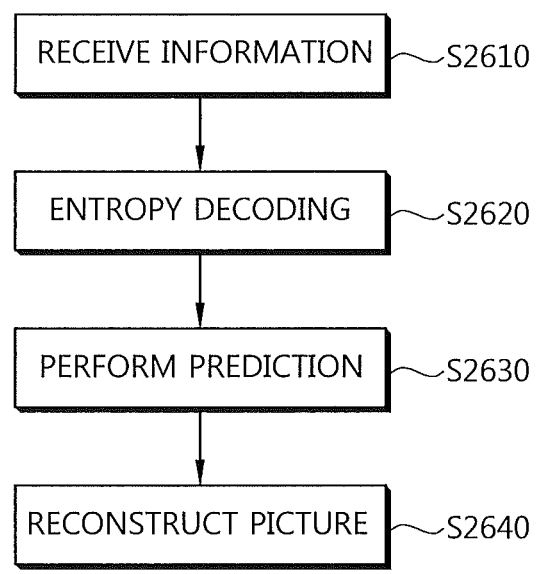
FIG. 26 is a diagram schematically illustrating an operation of the decoder in a system to which the present invention is applied.

FIG. 26 is a diagram schematically illustrating an operation of the decoder in a system to which the present invention is applied.

Referring to FIG. 26, the decoder receives information from the encoder in step S2610. The information received from the encoder may be transmitted being included in a bitstream. The information includes information on the prediction of the current block.

The decoder may extract necessary information by performing entropy decoding on the received information in step S2620. The decoder can determine what prediction type/prediction mode has been applied to the current block based on the extracted codeword. The extracted codeword might have been allocated by taking the frequency of occurrence of a prediction type/prediction mode into consideration as described above. Signaling order of the received information might have also been determined by taking the frequency of occurrence of a prediction mode/prediction type into consideration. Furthermore, a codeword included in the received information on the prediction mode/prediction may be a codeword allocated by jointly coding elements which form the information on the prediction mode/prediction type and corresponded to a prediction mode/prediction type applied to the current block from among the codewords. Detailed contents of the information on the prediction mode/prediction type have been described above.

The decoder may perform prediction on the current block in step S2630. The decoder may perform the prediction based on a prediction mode/prediction type that has been determined as the prediction mode/prediction type applied to the current block in a previous step.

The decoder may reconstruct a picture of the current block based on the prediction results in step S2640.

In the above exemplary systems, although the methods have been described in the form of a series of the steps or blocks, the present invention is not limited to the sequence of the steps, and some of the steps may be performed in different order from other or may be performed simultaneously with other steps. Furthermore, the above-described embodiments include various forms of examples. Accordingly, the present invention should be construed as including all other replacements, modifications, and changes which fall within the scope of the claims.

In the above description relating to the present invention, when there is reference to one element described as being "connected to" or "coupled with" the other element, the one element may be directly connected to the other element or may be coupled with the other element, but it should be understood that a third element may be placed between the two elements. In contrast, when it is said that one element is described as being "directly connected to" or "directly coupled with" the other element, it should be understood that a third element is not placed between the two elements.

The invention claimed is:

1. An image prediction method, by a decoding apparatus, the method comprising:
    receiving a bitstream including prediction information of a current block;
    determining a prediction mode applied to the current block based on the prediction information; and
    performing a prediction with regard to the current block based on the prediction mode,
    wherein determining the prediction mode includes:
        decoding a skip flag indicating whether a skip mode is applied to the current block; and
        decoding a merge flag indicating whether a merge mode is applied to a partition of the current block, when the skip flag represents value 0,
    wherein the skip flag and the merge flag are included in the prediction information,
    wherein the prediction information includes partition mode information representing a partition type of the current block, and
    wherein decoding of the partition mode information is performed between decoding of the skip flag and decoding of the merge flag.

2. The method of claim 1, wherein in the prediction based on the merge mode, a motion vector of a neighboring block to the partition is used as a motion vector of the partition.

3. The method of claim 1, wherein the partition type for inter prediction is one of partition types including 2N×2N partition type, 2N×N partition type, and N×2N partition type, and
    wherein a codeword for the 2N×2N partition type is "1", a codeword for the 2N×N partition type is "01", and a codeword for the N×2N partition type is "001".

4. The method of claim 1, wherein a short codeword is allocated to the partition mode information representing a partition type with a high frequency of occurrence.

5. The method of claim 1, wherein the prediction information comprises prediction mode information indicating whether inter prediction or intra prediction is applied to the current block,
    wherein decoding of the prediction mode information is performed between decoding of the skip flag and decoding of the merge flag.

6. The method of claim 1, wherein the prediction information comprises prediction mode information indicating whether inter prediction or intra prediction is applied to the current block,
    wherein decoding of the prediction mode information is performed between decoding of the skip flag and decoding of the merge flag.

7. The method of claim 1, wherein when the merge flag represent value 0, a motion vector of the partition is derived based on (i) a motion vector of a neighboring block to the partition, and (ii) an additional motion vector value,
    wherein the derived motion vector is obtained by adding the motion vector of the neighboring block and the additional motion vector value, wherein the additional motion vector value is obtained from the prediction information.

8. The method of claim 1, further comprising:
    receiving a split flag with respect to a coding unit; and
    deriving a current coding unit based on the split flag before the checking the skip flag.

9. The method of claim 8, wherein the current block is the current coding unit.

10. The method of claim 8, wherein N×N partition type is available only when a size of the current coding unit is same as a size of a minimum coding unit.

11. The method of claim 10, wherein a codeword for the N×N partition type consists of multiple values of 0 without a value of 1.

* * * * *